United States Patent
Choi et al.

(10) Patent No.: US 10,361,425 B2
(45) Date of Patent: Jul. 23, 2019

(54) RANDOM COPOLYMER, ELECTROLYTE, PROTECTED ANODE AND LITHIUM BATTERY INCLUDING THE SAME, AND METHOD OF PREPARING THE RANDOM COPOLYMER

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Hongsoo Choi, Seoul (KR); Tomonobu Mizumo, Osaka (JP); Jinkyu Kim, Yongin-si (KR); Myungjin Lee, Seoul (KR); Yonggun Lee, Suwon-si (KR); Wonseok Chang, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 414 days.

(21) Appl. No.: 15/151,558

(22) Filed: May 11, 2016

(65) Prior Publication Data
US 2017/0117536 A1 Apr. 27, 2017

(30) Foreign Application Priority Data
Oct. 23, 2015 (KR) .................. 10-2015-0148031

(51) Int. Cl.
*H01M 4/52* (2010.01)
*H01M 4/134* (2010.01)
(Continued)

(52) U.S. Cl.
CPC ............... *H01M 4/134* (2013.01); *C08F 8/44* (2013.01); *C08F 12/26* (2013.01); *C08F 212/08* (2013.01);
(Continued)

(58) Field of Classification Search
CPC ........ C08L 23/0876; C08F 8/44; C08F 12/26; C08F 212/08; H01M 4/134;
(Continued)

(56) References Cited

U.S. PATENT DOCUMENTS 5,441,841 A * 8/1995 Larson ................. G03G 9/1355
430/115
5,459,007 A * 10/1995 Larson ................. G03G 9/122
430/115
(Continued)

FOREIGN PATENT DOCUMENTS

JP 2010-285508 A 12/2010
KR 1020140013377 A 2/2014
(Continued)

OTHER PUBLICATIONS

Li et al., "Facile preparation of polymer electrolytes based on the polymerized ionic liquid poly((4-vinylbenzyl) trimethylammounium bis(trifluoromethanesulfonylimide)) for lithium secondary batteries", Electrochimica Acta, vol. 123, 2014, pp. 296-302.
(Continued)

*Primary Examiner* — Amanda C. Walke
(74) *Attorney, Agent, or Firm* — Cantor Colburn LLP

(57) ABSTRACT

A random copolymer including a first repeating unit represented by Formula 1 and a second repeating unit represented
(Continued)

by Formula 2 in a molar ratio of about 1:99 to about 99:1, wherein the polymer has a degree of polymerization of about 10 to about 5,000:

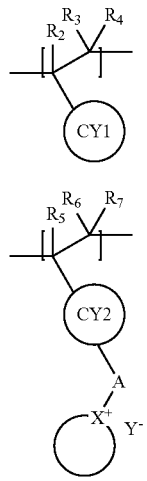

Formula 1

Formula 2 wherein CY1, CY2, A, X, $R_2$, $R_3$, $R_4$, $R_5$, $R_6$, $R_7$, and $Y^-$ are the same as defined in the detailed description.

17 Claims, 9 Drawing Sheets

(51) Int. Cl.
    *C08F 212/08*      (2006.01)
    *H01M 10/0565*      (2010.01)
    *C08L 23/08*      (2006.01)
    *C08F 8/44*      (2006.01)
    *C08F 12/26*      (2006.01)
    *H01M 10/052*      (2010.01)

(52) U.S. Cl.
    CPC ....... *C08L 23/0876* (2013.01); *H01M 10/052* (2013.01); *H01M 10/0565* (2013.01)

(58) Field of Classification Search
    CPC .. H01M 4/0404; H01M 4/131; H01M 4/1391; H01M 4/1395; H01M 4/382; H01M 4/525
    USPC ........................................................ 429/212
    See application file for complete search history.

(56) References Cited

U.S. PATENT DOCUMENTS

| | | | | |
|---|---|---|---|---|
| 5,525,450 | A * | 6/1996 | Spiewak | G03G 9/133 |
| | | | | 430/115 |
| 8,853,285 | B2 | 10/2014 | Kim et al. | |
| 9,079,171 | B2 * | 7/2015 | Geremia | C08F 212/08 |
| 2012/0148522 | A1 * | 6/2012 | Schlenoff | A61L 15/42 |
| | | | | 424/78.35 |
| 2014/0088207 | A1 * | 3/2014 | Elabd | H01M 2/1653 |
| | | | | 521/27 |
| 2015/0010849 | A1 | 1/2015 | Elabd et al. | |
| 2015/0228887 | A1 | 8/2015 | Park et al. | |
| 2015/0239756 | A1 * | 8/2015 | Jikihara | C02F 1/46109 |
| | | | | 204/554 |
| 2016/0336619 | A1 | 11/2016 | Choi et al. | |
| 2017/0008800 | A1 | 1/2017 | Kuo et al. | |
| 2017/0018800 | A1 | 1/2017 | Choi et al. | |
| 2017/0204287 | A1 * | 7/2017 | Schlenoff | C09D 201/02 |

FOREIGN PATENT DOCUMENTS

| | | |
|---|---|---|
| KR | 10-1379361 B1 | 3/2014 |
| KR | 10-1417305 B1 | 7/2014 |
| KR | 10-1453646 B1 | 10/2014 |
| KR | 2016-0133309 A | 11/2016 |

OTHER PUBLICATIONS

Madria et al., Ionic liquid electrolytes for lithium batteries: Synthesis, electrochemical, and cytotoxicity studies, Journal of Power Sources, 234, 2013, pp. 277-284.
McIntosh et al., "Morphology, Modulus, and conductivity of a Triblock Terpolymer/Ionic Liquid Electrolyte membrane", Macromolecules, vol. 47, 2014, pp. 1090-1098.
Murata et al. "An overview of the research and development of solid polymer electrolyte batteries", Electrochimica Acta, vol. 45, 2000, pp. 1501-1508.
Shaplov, et al., "Ionic IPNs as Novel Candidates for Highly conductive Solid Polymer Electrolytes", Journal of Polymer Science: Part A, vol. 47, 2009, pp. 4245-4266.
Weber et al., "Effect of Nanoscale Morphology on the conductivity of Polymerized Ionic Liquid Block copolymers", Macromolecules, vol. 44, 2011, pp. 5727-5735.
Yuan et al., "Poly(ionic liquid)s: Polymers expanding classical property profiles", Polymer, 52, 2011, pp. 1469-1482.

* cited by examiner

RANDOM COPOLYMER, ELECTROLYTE, PROTECTED ANODE AND LITHIUM BATTERY INCLUDING THE SAME, AND METHOD OF PREPARING THE RANDOM COPOLYMER

CROSS-REFERENCE TO RELATED APPLICATION

This application claims priority to and the benefit of Korean Patent Application No. 10-2015-0148031, filed on Oct. 23, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a random copolymer, an electrolyte, a protected anode and a lithium battery including the random copolymer, and a method of preparing the random copolymer.

2. Description of the Related Art

Carbonaceous materials, such as graphite, are representative examples of anode active materials used in lithium batteries. Graphite has excellent capacity retention characteristics and lithium intercalation potential. In addition, graphite undergoes no change in volume during intercalation/deintercalation of lithium ions, and provides high stability in a lithium battery. In addition, graphite has a low theoretical electrical capacity of about 372 milliampere hours per gram (mAh/g).

As an anode active material for a lithium battery, lithium metal may be used. Lithium metal has a very high electrical capacity per unit mass. However, lithium metal can form a dendrite at a surface thereof during intercalation/deintercalation of lithium ions, and thus may cause a short between a cathode and an anode.

Therefore, there is a need to develop a method of suppressing the formation of a dendrite at a surface of lithium metal.

SUMMARY

Provided is a novel copolymer.

Provided is an electrolyte including the copolymer.

Provided is a protected anode including the copolymer.

Provided is a lithium battery including the protected anode.

Provided is a method of preparing the copolymer.

Additional aspects will be set forth in part in the description which follows and, in part, will be apparent from the description, or may be learned by practice of the presented exemplary embodiments.

According to an aspect of an exemplary embodiment, a random copolymer includes a first repeating unit represented by Formula 1 and a second repeating unit represented by Formula 2 in a molar ratio of about 1:99 to about 99:1, wherein the copolymer has a degree of polymerization of about 10 to about 5,000:

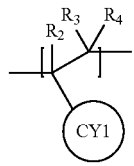

Formula 1

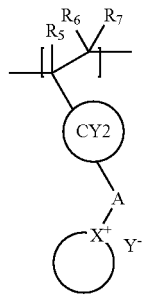

Formula 2 wherein

CY1 and CY2 are each independently a substituted or unsubstituted $C_6$-$C_{30}$ aryl ring or a substituted or unsubstituted $C_2$-$C_{30}$ heteroaryl ring, A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group,

is a 3 to 31-membered ring containing X and 2 to 30 carbon atoms,

X is S, N($R_9$), or P($R_{10}$), $R_2$ to $R_7$, $R_9$, and $R_{10}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group, and $Y^-$ is an anion.

According to an aspect of another exemplary embodiment, an electrolyte includes the random copolymer.

According to an aspect of another exemplary embodiment, a protected anode includes:

an anode; and a protective layer disposed on the anode, wherein the protective layer includes the random copolymer.

According to an aspect of another exemplary embodiment, a lithium battery includes:
a cathode,
the protected anode, and
an electrolyte disposed between the cathode and the protected anode.

According to an aspect of another exemplary embodiment, a method of preparing a random copolymer includes: polymerizing a first monomer represented by Formula 8 and a second monomer represented by Formula 9:

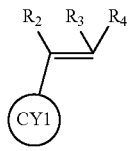

Formula 8

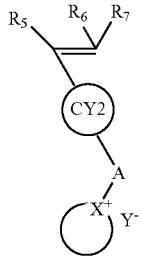

Formula 9 wherein CY1 and CY2 are each independently a substituted or unsubstituted $C_6$-$C_{30}$ aryl ring or a substituted or unsubstituted $C_2$-$C_{30}$ heteroaryl ring, A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group,

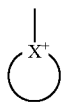

is a 3 to 31-membered ring containing X and 2 to 30 carbon atoms,

X is S, N($R_9$), or P($R_{10}$), $R_2$ to $R_7$, $R_9$, and $R_{10}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group, and $Y^-$ is an anion.

BRIEF DESCRIPTION OF THE DRAWINGS

These and/or other aspects will become apparent and more readily appreciated from the following description of the exemplary embodiments, taken in conjunction with the accompanying drawings in which:

FIGS. 4A and 4B are scanning electron microscope (SEM) images showing surfaces and cross-sections of an anode manufactured according to Comparative Example 2 after charging, in which FIG. 4B is an enlarged view of FIG. 4A;

FIGS. 4C and 4D are scanning electron microscope (SEM) images showing surfaces and cross-sections of an anode manufactured according to Example 2 after charging, in which FIG. 4D is an enlarged view of FIG. 4C;

FIGS. 4E and 4F are scanning electron microscope (SEM) images showing surfaces and cross-sections of an anode manufactured according to Example 5 after charging, in which FIG. 4F is an enlarged view of FIG. 4E;

DETAILED DESCRIPTION

Figure 1:
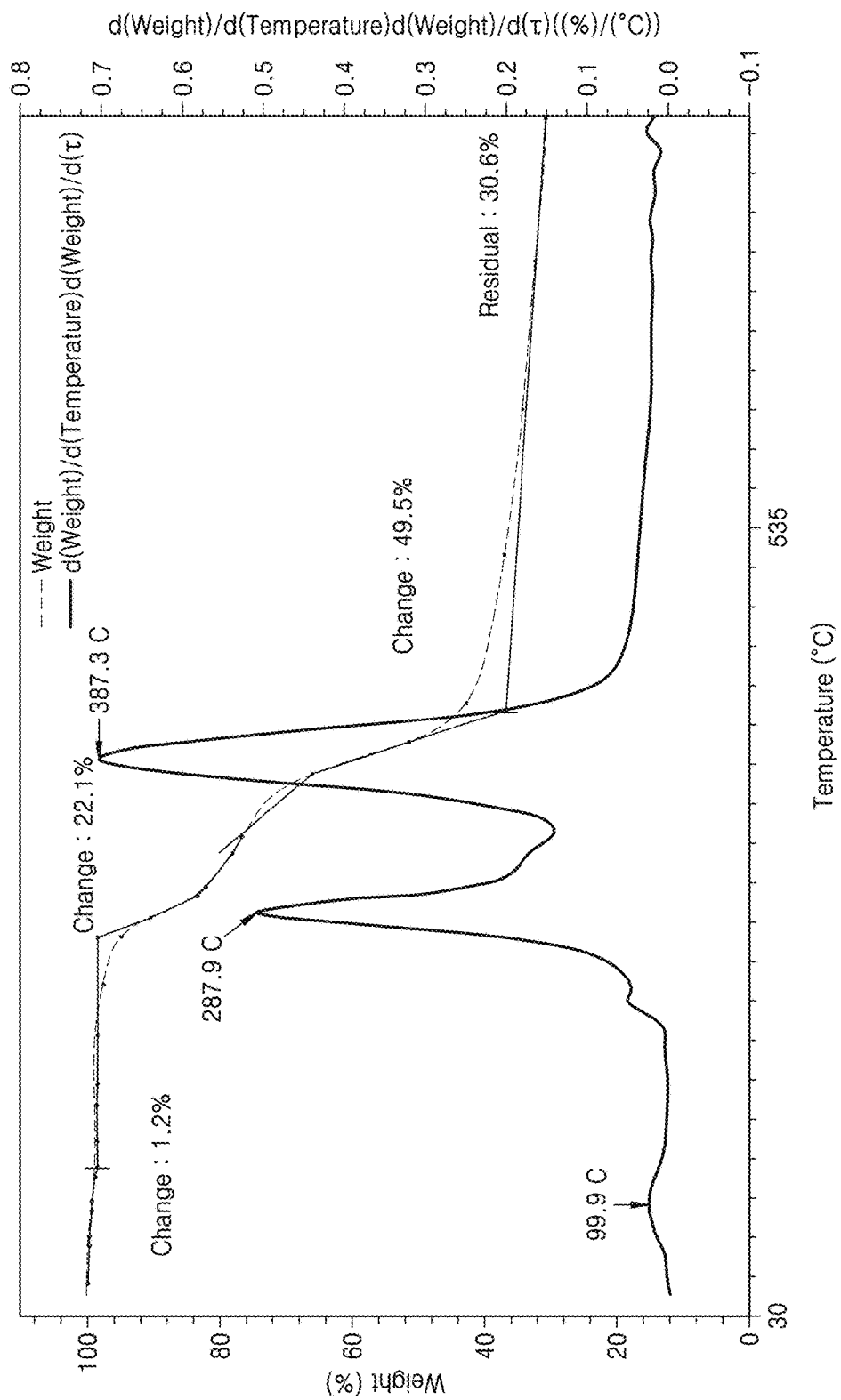
FIG. 1 is a graph of weight change (percent, %) versus temperature (degrees Centigrade, ° C.), illustrating the results of thermogravimetric analysis (TGA) of a random copolymer prepared according to Example 2.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. "At least one" is not to be construed as limiting "a" or "an."

The term "or" means "and/or." As used herein, the terms such as "comprising," "including," "having," or the like are intended to indicate the existence of the features regions, integers, steps, operations, components, and/or elements disclosed in the specification, and are not intended to preclude the possibility that one or more other features or elements may exist or may be added.

It will also be understood that when an element such as a layer, a region or a component is referred to as being "on" another layer or element, it can be directly on the other layer or element, or intervening layers, regions, or components may also be present. In contrast, when an element is referred to as being "directly on" another element, there are no intervening elements present.

In the drawings, the sizes of elements are exaggerated or reduced for ease of description. The size or thickness of each element shown in the drawings are arbitrarily illustrated for better understanding or ease of description, and thus the present disclosure is not limited thereto.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, with reference to attached drawings, an electrolyte for a secondary battery, a method of preparing the electrolyte, and a secondary battery including the electrolyte according to an exemplary embodiment will be described in detail. However, these are for illustrative purposes only and are not intended to limit the scope of the inventive concept. The scope of the inventive concept is indicated by the claims rather than by the detailed description.

A C rate means a current which will discharge a battery in one hour, e.g., a C rate for a battery having a discharge capacity of 1.6 ampere-hours would be 1.6 amperes.

Hereinafter, a random copolymer according to an exemplary embodiment, and an electrolyte, a protected anode, and a lithium battery including the random copolymer, and methods of preparing the foregoing are disclosed in further detail.

A random copolymer according to an embodiment of the present disclosure includes a first repeating unit represented by Formula 1 below and a second repeating unit represented by Formula 2 below and has a degree of polymerization of about 10 to about 5,000:

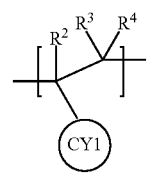

Formula 1

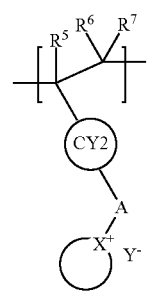

Formula 2 wherein

CY1 and CY2 are each independently a substituted or unsubstituted $C_6$-$C_{30}$ aryl ring or a substituted or unsubstituted $C_2$-$C_{30}$ heteroaryl ring;

A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group;

is a 3 to 31-membered ring containing X and 2 to 30 carbon atoms;

X is S, N($R_9$), or P($R_{10}$);

$R_2$ to $R_7$, $R_9$, and $R_{10}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group, and $Y^-$ is an anion.

The random copolymer irregularly includes an ionic liquid moiety-containing repeating unit and an ionic liquid moiety-free repeating unit, and thus may have entirely uniform physical properties.

For example, in the case of a block copolymer obtained from an ionic liquid moiety-containing repeating unit and an ionic liquid moiety-free repeating unit, charge localization readily occurs at a polymer block containing the ionic liquid moiety-free repeating unit, thus making it difficult to effectively suppress the growth of dendrites due to local reduction of lithium ions at a surface of lithium (Li) metal.

By contrast, a random copolymer of ionic liquid moiety-containing monomers and ionic liquid moiety-free monomers provides entirely uniform charge delocalization effects, and thus the formation of dendrites due to a local increase in lithium ions at a surface of Li metal may be suppressed more effectively.

For example, in the random copolymer including the repeating units of Formulae 1 and 2,

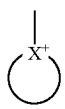

may be a 3 to 31-membered aliphatic ring. Since

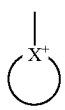

of the random copolymer is an aliphatic ring, the random copolymer is stable in a wider voltage range than an ionic liquid polymer including aromatic rings, and thus may provide a wider electrochemical window. For example, the random copolymer may provide a wider reduction voltage range for Li metal. For example, the random copolymer may be electrochemically stable even in a negative voltage range with respect to Li metal. The expression "electrochemically stable" as used herein indicates that a current produced by oxidation or reduction of the random copolymer corresponds to ½ or less of a current produced by oxidation/reduction of lithium.

The 3 to 31-membered aliphatic ring of the random copolymer is not particularly limited and any suitable aliphatic ring being capable of acting as a moiety corresponding to a cation of ionic liquid may be used.

For example, in the random copolymer, the repeating unit of Formula 1 may have a degree of polymerization of about 10 to about 5,000, or about 100 to about 5,000, and the repeating unit of Formula 2 may have a degree of polymerization of about 10 to about 1,000, or about 100 to about 5,000. For example, in the random copolymer including the repeating units of Formulae 1 and 2, the repeating unit of Formula 1 may have a degree of polymerization of about 10 to about 4,000, or about 100 to about 4,000, and the repeating unit of Formula 2 may have a degree of polymerization of about 10 to about 800, or about 100 to about 800.

For example, the molar ratio of the repeating unit of Formula 1 to the repeating unit of Formula 2 may be in the range of about 30:70 to about 99:1. For example, the molar ratio of the repeating unit of Formula 1 to the repeating unit of Formula 2 may be in the range of about 50:50 to about 99:1. For example, the molar ratio of the repeating unit of Formula 1 to the repeating unit of Formula 2 may be in the range of about 60:40 to about 90:10. For example, the molar ratio of the repeating unit of Formula 1 to the repeating unit of Formula 2 may be in the range of about 65:35 to about 85:15. For example, the molar ratio of the repeating unit of Formula 1 to the repeating unit of Formula 2 may be in the range of about 70:30 to about 80:20. While not wishing to be bound by theory, it is understood that when the amount of the repeating unit of Formula 1 is too small, the random copolymer may have deteriorated mechanical strength and solubility thereof with respect to a solvent may be reduced. On the other hand, when the amount of the repeating unit of Formula 1 is too large, ionic conductivity and charge delocalization effects of the random copolymer may deteriorate.

For example, the random copolymer may be represented by Formula 3 below:

Formula 3

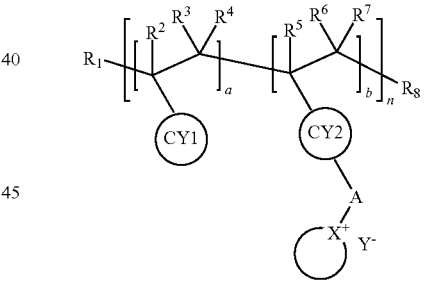

wherein

CY1 and CY2 are each independently a substituted or unsubstituted $C_6$-$C_{30}$ aryl ring or a substituted or unsubstituted $C_2$-$C_{30}$ heteroaryl ring;

A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group;

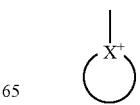

is a 3 to 31-membered ring containing X and 2 to 30 carbon atoms;

X is S, $N(R_9)$, or $P(R_{10})$;

$R_1$ to $R_{10}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group; $Y^-$ is an anion; $0.01 \leq a \leq 0.99$, $0.01 \leq b \leq 0.99$, provided that $a+b=1$; and n is an integer of 10 to 5,000.

For example, in Formula 3, $0.3 \leq a \leq 0.99$ and $0.01 \leq b \leq 7$. For example, in Formula 3, $0.5 \leq a \leq 0.99$ and $0.01 \leq b \leq 5$. For example, in Formula 3, $0.6 \leq a \leq 0.9$ and $0.1 \leq b \leq 4$. For example, in Formula 3, $0.65 \leq a \leq 0.85$ and $0.15 \leq b \leq 0.35$. For example, in Formula 3, $0.7 \leq a \leq 0.8$ and $0.2 \leq b \leq 0.3$.

For example, in the random copolymer,

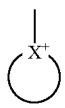

of Formulae 2 and 3 may be represented by Formula 4 below:

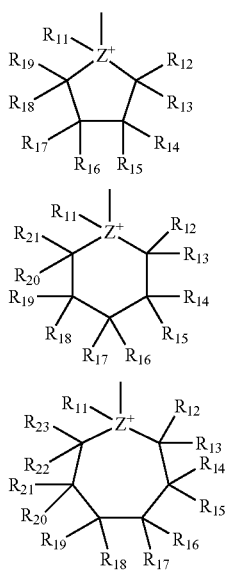

Formula 4

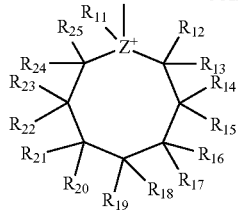

wherein

Z is S, N, or P, and $R_{11}$ to $R_{25}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group, provided that $R_{11}$ is absent when Z is S.

For example, in the random copolymer,

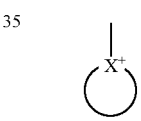

of Formulae 2 and 3 may be represented by Formula 5 below:

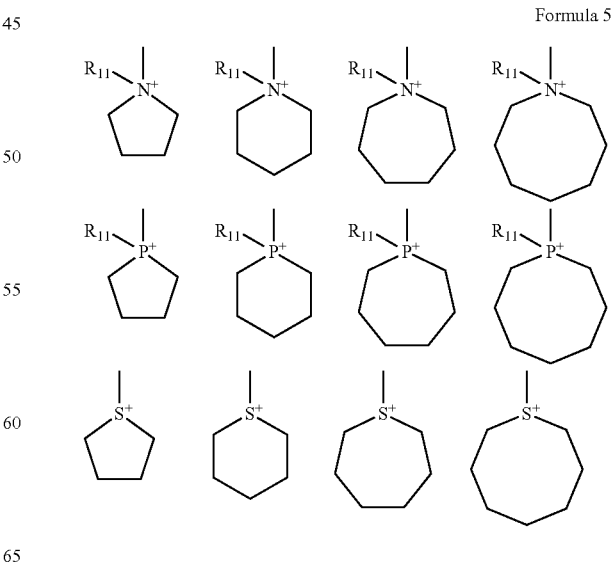

Formula 5 wherein $R_{11}$ is hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group.

For example, the random copolymer may be represented by Formula 6 below:

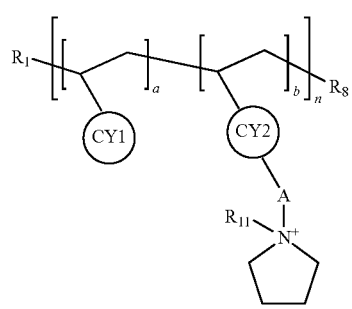

Formula 6 wherein

CY1 and CY2 are each independently a substituted or unsubstituted $C_6$-$C_{30}$ aryl ring or a substituted or unsubstituted $C_2$-$C_{30}$ heteroaryl ring;

A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group;

$R_1$, $R_8$, and $R_{11}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group;

$Y^-$ is at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$;

$0.01 \leq a \leq 0.99$, $0.01 \leq b \leq 0.99$, provided that $a+b=1$; and n is an integer of 10 to 5,000.

For example, the random copolymer may be represented by Formula 7 below:

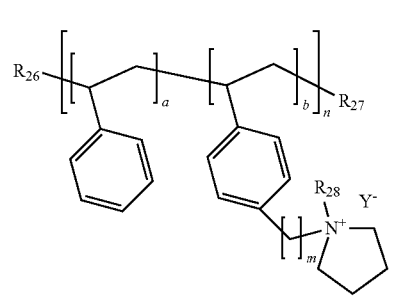

Formula 7 wherein $R_{26}$, $R_{27}$, and $R_{28}$ are each independently hydrogen, a halogen atom, a substituted or unsubstituted $C_1$-$C_{30}$ alkyl group, a substituted or unsubstituted $C_1$-$C_{30}$ alkoxy group, or a substituted or unsubstituted $C_2$-$C_{100}$ alkyleneoxide group; r is at least one anion selected from $BE_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3O_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$;

$0.01 \leq a \leq 0.99$, $0.01 \leq b \leq 0.99$, provided that $a+b=1$; and m is an integer of 1 to 10 and n is an integer of 10 to 5,000.

For example, in Formula 7, $R_{28}$ may be methyl, ethyl, propyl, or butyl.

For example, the random polymer may have a weight average molecular weight of about 3,000 Daltons to about 200,000 Daltons. For example, the random copolymer may have a number average molecular weight of about 5,000 Daltons to about 100,000 Daltons. For example, the random copolymer may have a number average molecular weight of about 10,000 Daltons to about 80,000 Daltons. For example, the random copolymer may have a number average molecular weight of about 20,000 Daltons to about 50,000 Daltons. For example, the random copolymer may have a number average molecular weight of about 30,000 Daltons to about 45,000 Daltons. By including the random copolymer within the molecular weight ranges described above, lithium battery performance may be further enhanced. While not wishing to be bound by theory, it is understood that when the molecular weights of the random copolymer are too low, mechanical strength thereof is too low, and thus it may be difficult to suppress the growth of a lithium dendrite. On the other hand, when the molecular weights of the random copolymer are too high, its mechanical strength is too high, and thus swelling due to permeation of a liquid electrolyte in a lithium battery does not occur, and accordingly, transfer of lithium ions may be restricted.

For example, the random copolymer may have a polydispersity index (PDI) of about 1 to about 3. For example, the random copolymer may have a PDI of about 1 to about 2.5. For example, the random copolymer may have a PDI of about 1 to about 2.0. For example, the random copolymer may have a PDI of about 1.2 to about 2.8. By including the random copolymer within the PDI ranges described above, lithium battery performance may be further enhanced. When the PDI of the random copolymer is too high, physical properties thereof may not be uniform.

For example, the random copolymer may have a glass transition temperature ($T_g$) of about 30° C. to about 90° C. For example, when the weight average molecular weight of the random copolymer is 37,000 Daltons, the glass transition temperature ($T_g$) thereof may be 55° C. By including the random copolymer within the glass transition temperature ($T_g$) range described above, lithium battery performance may be further enhanced.

The random copolymer may further include another repeating unit in addition to the repeating units of Formulae 1 and 2. By further including the repeating unit, physical properties of the random copolymer may be further adjusted. The random copolymer may further include, for example, a third repeating unit obtained from an ethylenically-unsaturated compound copolymerizable with the monomers that provide repeating units of Formulae 1 and 2. The third repeating unit can be a monomer including a vinyl group, an allyl group, a $C_1$-$C_6$ alkyl acrylate group, or a $C_1$-$C_6$ alkyl methacrylate group. However, the repeating units of the random copolymer are not limited to the above examples, and any suitable repeating unit obtained from a monomer may be used.

The random copolymer may be electrochemically stable to −0.4 volts (V) with respect to Li. That is, a reduction current due to a side reaction of the random copolymer may be negligible, e.g., disregarded, up to −0.4 V with respect to Li. For example, the random copolymer may provide an electrochemically stable, wide voltage window ranging from about −0.4 V to about 6.2 V. For example, the random copolymer may provide a voltage window ranging from about −0.4 V to about 6.0 V with respect to Li metal. For example, the random copolymer may provide a voltage window ranging from about −0.4 V to about 5.5 V with respect to Li metal. For example, the random copolymer may provide a voltage window ranging from about −0.4 V to about 5.0 V with respect to Li metal. For example, the random copolymer may provide a voltage window ranging from about −0.4 V to about 4.5 V with respect to Li metal.

An electrolyte according to another embodiment of the present disclosure includes the random copolymer described above. By including the random copolymer, an electrolyte with enhanced durability and ionic conductivity may be obtained. In addition, a lithium battery including such an electrolyte may have enhanced charge/discharge characteristics.

The electrolyte including the random copolymer described above may further include a lithium salt. For example, the lithium salt may be $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are each independently 1 to 30), LiF, LiBr, LiCl, LiI, $LiB(C_2O_4)_2$ (lithium bis(oxalate) borate, LiBOB), lithium bis(trifluoromethanesulfonyl)imide (LiTFSI), $LiNO_3$, or a combination thereof. However, the lithium salt is not limited to the above examples and any suitable lithium salt may be used.

In addition, the electrolyte including the random copolymer described above may further include another polymer. The other polymer is not particularly limited and any suitable other polymer for an electrolyte. For example, the electrolyte may further include polyethyleneoxide (PEO), polyvinyl alcohol (PVA), or the like.

The electrolyte including the random copolymer described above may be in the form of a membrane, a sheet, a film, or the like. However, the type of the electrolyte is not limited to the above examples and any suitable type of electrolyte may be used.

In addition, the electrolyte including the random copolymer described above may be a liquid electrolyte or a solid electrolyte.

For example, a liquid electrolyte including the random copolymer described above may further include an organic solvent, an ionic liquid, or a combination thereof, and may be in a liquid state at room temperature.

The organic solvent may include an aprotic solvent. For example, the aprotic solvent may be a carbonate solvent, an ester solvent, an ether solvent, a ketone solvent, an alcohol solvent, or a combination thereof. Examples of the carbonate solvent include dimethyl carbonate (DMC), diethyl carbonate (DEC), ethyl methyl carbonate (EMC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), and tetraethylene glycol dimethyl ether (TEGDME). Examples of the ester solvent include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ether solvent include dibutyl ether, tetraglyme, diglyme, dimethoxyethane, 2-methyl tetrahydrofuran, and tetrahydrofuran. An example of the ketone solvent is cyclohexanone. In addition, the alcohol solvent may be ethyl alcohol, isopropyl alcohol, or the like. However, the alcohol solvent is not limited to the above examples and may be any protic solvent that may be used in the art.

Examples of the ionic liquid include [emim]Cl/$AlCl_3$ (emim=ethyl methyl imidazolium), [bmpyr]$NTf_2$ (bmpyr=butyl methyl pyridinium), [bpy]Br/$AlCl_3$(bpy=4,4'-bipyridine), [choline]Cl/$CrCl_3 6H_2O$, [Hpy($CH_2$)$_3$pyH][$NTf_2$]$_2$ (Hpy and pyH=pyridinium, NTf=trifluoromethanesulfonimide), [emim]OTf/[hmim]I (hmim=hexyl methyl imidazolium), [choline]Cl/$HOCH_2CH_2OH$, [$Et_2MeN(CH_2CH_2OMe)$]$BF_4$ (Et=ethyl, Me=methyl, Pr=propyl, Bu=butyl, Ph=phenyl, Oct=octyl, Hex=hexyl), [$Bu_3PCH_2CH_2C_8F_{17}$]OTf (OTf=trifluoromethane sulfonate), [bmim]$PF_6$ (bmim=butyl methyl imidazolium), [bmim]$BF_4$, [omim]$PF_6$ (omim=octyl methyl imidazolium), [$Oct_3PC_{18}H_{37}$]I, [NC($CH_2$)$_3$mim]$NTf_2$ (mim=methyl imidazolium), [$Pr_4$N][B(CN)$_4$], [bmim]$NTf_2$, [bmim]Cl, [bmim][Me(O$CH_2CH_2$)$_2$O$SO_3$], [Ph$CH_2$mim]OTf, [$Me_3$NCH(Me)CH(OH)Ph]$NTf_2$, [pmim][(HO)$_2$P$O_2$](pmim=propyl methyl imidazolium), [b(6-Me)quin]$NTf_2$ (bquin=butyl quinolinium, [bmim][$Cu_2Cl_3$], [$C_{18}H_{37}$O$CH_2$mim]$BF_4$ (mim=methyl imidazolium), [heim]$PF_6$ (heim=hexyl ethyl imidazolium), [mim($CH_2CH_2$O)$_2$$CH_2CH_2$mim][$NTf_2$]$_2$ (mim=methyl imidazolium), [obim]$PF_6$ (obim=octyl butyl imidazolium), [oquin]$NTf_2$ (oquin=octyl quinolinium), [hmim][$PF_3(C_2F_5)_3$], [$C_{14}H_{29}$mim]Br (mim=methyl imidazolium), [$Me_2$N($C_{12}H_{25}$)$_2$]$NO_3$, [emim]$BF_4$, [mm(3-$NO_2$)im][dinitrotriazolate], [MeN($CH_2CH_2$OH)$_3$], [MeO$SO_3$], [$Hex_3PC_{14}H_{29}$]$NTf_2$, [emim][EtO$SO_3$], [choline][ibuprofenate], [emim]$NTf_2$, [emim][(EtO)$_2$P$O_2$], [emim]Cl/$CrCl_2$, and [$Hex_3PC_{14}H_{29}$]N(CN)$_2$. However, the ionic liquid is not limited to the above examples and may be any suitable ionic liquid.

A solid electrolyte including the random copolymer described above may be in a solid state at room temperature and may not include an organic solvent.

The solid electrolyte may be in a solid state at 25° C. or less. By including the random copolymer in the electrolyte, the electrolyte may be in a solid state at room temperature. For example, the electrolyte may be in a solid state at 30° C. or less. For example, the electrolyte may be in a solid state at 35° C. or less. For example, the electrolyte may be in a solid state at 40° C. or less. For example, the electrolyte may be in a solid state at 45° C. or less. For example, the electrolyte may be in a solid state at 50° C. or less.

The solid electrolyte may be a solvent-free electrolyte. For example, the solid electrolyte may be a solid polymer electrolyte that is solvent free and contains only a polymer such as a random copolymer and a lithium salt. Since the electrolyte is solvent free, problems, e.g., side reactions due to a solvent, leakage of a solvent, and the like, may be avoided.

A solvent-free solid electrolyte is distinguished from a polymer gel electrolyte, in which a solid polymer includes a small amount of solvent. The polymer gel electrolyte may have enhanced ionic conductivity, for example, through which an ionic conductive polymer includes a small amount of solvent.

A protected anode according to another embodiment of the present disclosure includes:

an anode; and a protective layer on the anode, wherein the protective layer includes the random copolymer described above.

Since the protective layer includes the random copolymer, the formation of a dendrite at a surface of the protected anode in a lithium battery during charging and discharging is suppressed, and thus charge/discharge characteristics of the lithium battery may be enhanced.

The anode of the protected anode may include lithium (Li) metal, a Li metal alloy, or a material capable of intercalating and deintercalating lithium. However, the anode material is not limited to the above examples and any suitable anode that includes Li or a material capable of intercalating and deintercalating Li ions may be used. An anode can effectively determine the capacity of a lithium battery, and thus the anode of the protected anode may be selected to be, for example, Li metal or a Li metal alloy because Li has a high theoretical energy density. Examples of the Li metal alloy include alloys of lithium and aluminum, tin, magnesium, indium, calcium, titanium, vanadium, or the like.

The protective layer may further include a lithium salt. By further including the lithium salt, the ionic conductivity of the protective layer increases, and thus an interface resistance between the protected anode and the electrolyte may be reduced. The lithium salt may be the same as that included in the electrolyte including the random copolymer described above.

The protective layer may have a thickness of about 0.1 micrometers (μm) to about 100 μm. For example, the protective layer may have a thickness of about 0.2 μm to about 90 μm. For example, the protective layer may have a thickness of about 0.3 μm to about 80 μm. For example, the protective layer may have a thickness of about 0.4 μm to about 70 μm. For example, the protective layer may have a thickness of about 0.5 μm to about 50 μm. For example, the protective layer may have a thickness of about 1 μm to about 50 μm. For example, the protective layer may have a thickness of about 1 μm to about 30 μm. For example, the protective layer may have a thickness of about 1 μm to about 20 μm. For example, the protective layer may have a thickness of about 1 μm to about 10 μm. By including the protective layer within the thickness ranges described above, a lithium battery including the protected anode may have enhanced charge/discharge characteristics. While not wishing to be bound by theory, it is understood that when the thickness of the protective layer is too low, the strength of the protective layer is poor, and thus it may be difficult for the protective layer to function well. On the other hand, when the thickness of the protective layer is too high, it is difficult for swelling due to a solvent to occur, and accordingly, transfer of lithium ions may also be difficult. For example, the protective layer may act as a solid polymer electrolyte membrane.

In the protected anode, the protective layer may be disposed on one surface or opposite surfaces of the anode. In another embodiment, the protective layer may completely cover the anode. Thus, the formation of a dendrite at the entire surface of the anode may be effectively suppressed.

The protective layer may have a single layer structure or a multi-layer structure. When the protective layer has a multi-layer structure, physical properties of the protective layer may be readily adjusted solely by varying the composition of each of a plurality of layers. At least one of the layers of the protective layer may include the random copolymer described above.

A lithium battery according to another embodiment of the present disclosure includes:

a cathode, the protected anode described above, and an electrolyte between the cathode and the protected anode.

Since the lithium battery includes the protected anode, the formation of a dendrite at a surface of the anode is suppressed, whereby charge/discharge characteristics of the lithium battery may be enhanced.

In the lithium battery, the electrolyte may be an electrolyte including the random copolymer described above. For example, the electrolyte that includes the random copolymer and is disposed between the cathode and the protected anode may be a liquid electrolyte or a solid electrolyte. For example, the liquid electrolyte or the solid electrolyte may not include the random copolymer.

The lithium battery including the protected anode may be a lithium ion battery or a lithium air battery. In addition, the lithium battery may be a primary battery or a secondary battery.

The lithium ion battery may be manufactured using, for example, the following method.

First, the protected anode described above is prepared.

Next, a cathode is prepared.

For example, a cathode active material composition is prepared by mixing a cathode active material, a conductive material, a binder, and a solvent together. The cathode active material composition may be directly coated onto a metal current collector and dried to manufacture a cathode plate. In another embodiment, the cathode active material composition may be cast onto a separate support, and a film separated from the support may be laminated on a metal current collector to manufacture a cathode plate.

The cathode active material may include lithium cobalt oxide, lithium nickel cobalt manganese oxide, lithium nickel cobalt aluminum oxide, lithium iron phosphorous oxide, lithium manganese oxide, or a combination thereof. However, the cathode active material is not limited to these examples, and may be any cathode active material used in the art.

For example, the cathode active material may be a compound represented by any one of Formulae: $Li_aA_{1-b}B'_bD'_2$ wherein $0.90 \le a \le 1.8$ and $0 \le b \le 0.5$; $Li_aE_{1-b}B'_bO_{2-c}D_c$ wherein $0.90 \le a \le 1.8$, $0 \le b \le 0.5$, and $0 \le c \le 0.05$; $LiE_{2-b}B'_bO_{4-c}D'_c$ wherein $0 \le b \le 0.5$ and $0 \le c \le 0.05$; $Li_aNi_{1-b-c}Co_bB'_cD'_\alpha$ wherein $0.90 \le a \le 1.8$, $0 \le b \le 0.5$, $0 \le c \le 0.05$, and $0 < \alpha \le 2$; $Li_aNi_{1-b-c}Co_bB'_cO_{2-\alpha}F'_\alpha$ wherein $0.90 \le a \le 1.8$, $0 \le b \le 0.5$, $0 \le c \le 0.05$, and $0 < \alpha < 2$; $Li_aNi_{1-b-c}Co_bB'_cO_{2-\alpha}F'_2$ wherein $0.90 \le a \le 1.8$, $0\ b\ 0.5$, $0 \le c \le 0.05$, and $0 < \alpha < 2$; $Li_aNi_{1-b-c}Mn_bB'_cD'_\alpha$ wherein $0.90 \le a \le 1.8$, $0 \le b \le 0.5$, $0 \le c \le 0.05$, and $0 < \alpha \le 2$; $Li_aNi_{1-b-c}Mn_bB'_cO_{2-\alpha}F'$, wherein $0.90 \le a \le 1.8$, $0 \le b \le 0.5$, $0 \le c \le 0.05$, and $0 < \alpha < 2$; $Li_aNi_{1-b-c}Mn_bB'_cO_{2-\alpha}F'_2$ wherein $0.90 \le a \le 1.8$, $0 \le b \le 0.5$, $0 \le c \le 0.05$, and $0 < \alpha < 2$; $Li_aNi_bE_cG_dO_2$ wherein $0.90 \le a \le 1.8$, $0 \le b \le 0.9$, $0 \le c \le 0.5$, and $0.001 \le d \le 0.1$; $Li_aNi_bCo_cMn_dGeO_2$ wherein $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ wherein $0.90 \le a \le 1.8$ and $0.001 \le b \le 0.1$; $Li_aCoG_bO_2$ wherein $0.90 \le a \le 1.8$ and $0.001 \le b \le 0.1$; $Li_aMnG_bO_2$ wherein $0.90 \le a \le 1.8$ and $0.001 \le b \le 0.1$; $Li_aMn_2G_bO_4$ wherein $0.90 \le a \le 1.8$ and $0.001 \le b \le 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ wherein $0 \le f \le 2$; $Li_{(3-f)}Fe_2(PO_4)_3$ wherein $0 \le f \le 2$; and $LiFePO_4$.

In the formulae above, A is nickel (Ni), cobalt (Co), manganese (Mn), or a combination thereof; B' is aluminum (Al), Ni, Co, Mn, chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is Co, Mn, or a combination thereof; F' is F, S, P, or a combination thereof; G is Al, Cr, Mn, Fe, Mg, lanthanum (La), cerium (Ce), strontium (Sr), V, or a combination thereof; Q is titanium (Ti), molybdenum (Mo), Mn, or a combination thereof; I' is Cr, V, Fe, scandium (Sc), yttrium (Y), or a combination thereof; and J is V, Cr, Mn, Co, Ni, copper (Cu), or a combination thereof.

The compounds described above may have a coating layer disposed on their surfaces. In another embodiment, the compounds may instead be used in combination with a compound including a coating layer. The coating layer may include a coating element compound, such as an oxide of a coating element, a hydroxide of a coating element, an oxyhydroxide of a coating element, an oxycarbonate of a coating element, or a hydroxy carbonate of a coating element. The coating element compounds may be amorphous or crystalline. The coating element included in the coating layer may be Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a mixture thereof. The coating layer may be formed by using the coating elements in the aforementioned compounds by using any one of various methods that do not adversely affect physical properties of a cathode active material (e.g., spray coating or immersion). The coating layer formation methods are apparent to one of ordinary skill in the art, and thus, are not described in detail.

For example, the cathode active material may be $LiNiO_2$, $LiCoO_2$, $LiMn_xO_{2x}$ wherein $x=1$ or 2, $LiNi_{1-x}Mn_xO_2$ wherein $0<x<1$, $LiNi_{1-x-y}Co_xMn_yO_2$ wherein $0 \le x \le 0.5$ and $0 \le y \le 0.5$, $LiFeO_2$, $V_2O_5$, $TiS_2$, $MoS_2$, or the like.

The conductive material, the binder, and the solvent used for the cathode active material composition may be the same as those used for an anode active material composition. In some embodiments, a plasticizer may be further added into the cathode active material composition and/or the anode active material composition to form pores in electrode plates.

The amounts of the cathode active material, the conductive material, a general binder, and the solvent are those levels generally used in lithium batteries. The conductive material, a general binder, the solvent, or a combination thereof may not be utilized according to the use and the structure of the lithium battery.

Next, a separator is disposed between the cathode and the anode.

The separator is a separator for lithium batteries that includes modified microfibrillated cellulose with carboxyl groups at a surface thereof, in which counter ions of the carboxyl groups include lithium ions. In the counter ions, the weight of metal ions except for lithium is 10 percent by weight (wt %) or less with respect to the total weight of the lithium ions, and the separator has an average pore diameter of about 0.05 μm to about 1 μm.

Next, an electrolyte is prepared. The electrolyte may be in a liquid electrolyte or a gel electrolyte. The electrolyte may include the random copolymer described above.

For example, the electrolyte may be an organic electrolytic solution. The organic electrolytic solution may be prepared by dissolving a lithium salt in an organic solvent. The organic solvent may be selected from the protic solvents described above. The lithium salt may be the same as that included in the electrolyte described above.

In another embodiment, the electrolyte may be a solid electrolyte. For example, the electrolyte may be boron oxide, lithium oxynitride, or the like. However, the electrolyte is not limited to the above examples, and any suitable solid electrolyte may be used. A solid electrolyte may be formed on the anode using a method, such as sputtering or the like.

Finally, the electrolyte is injected between the cathode, the protected anode, and the separator disposed therebetween, thereby completing the manufacture of a lithium ion battery.

Figure 7:
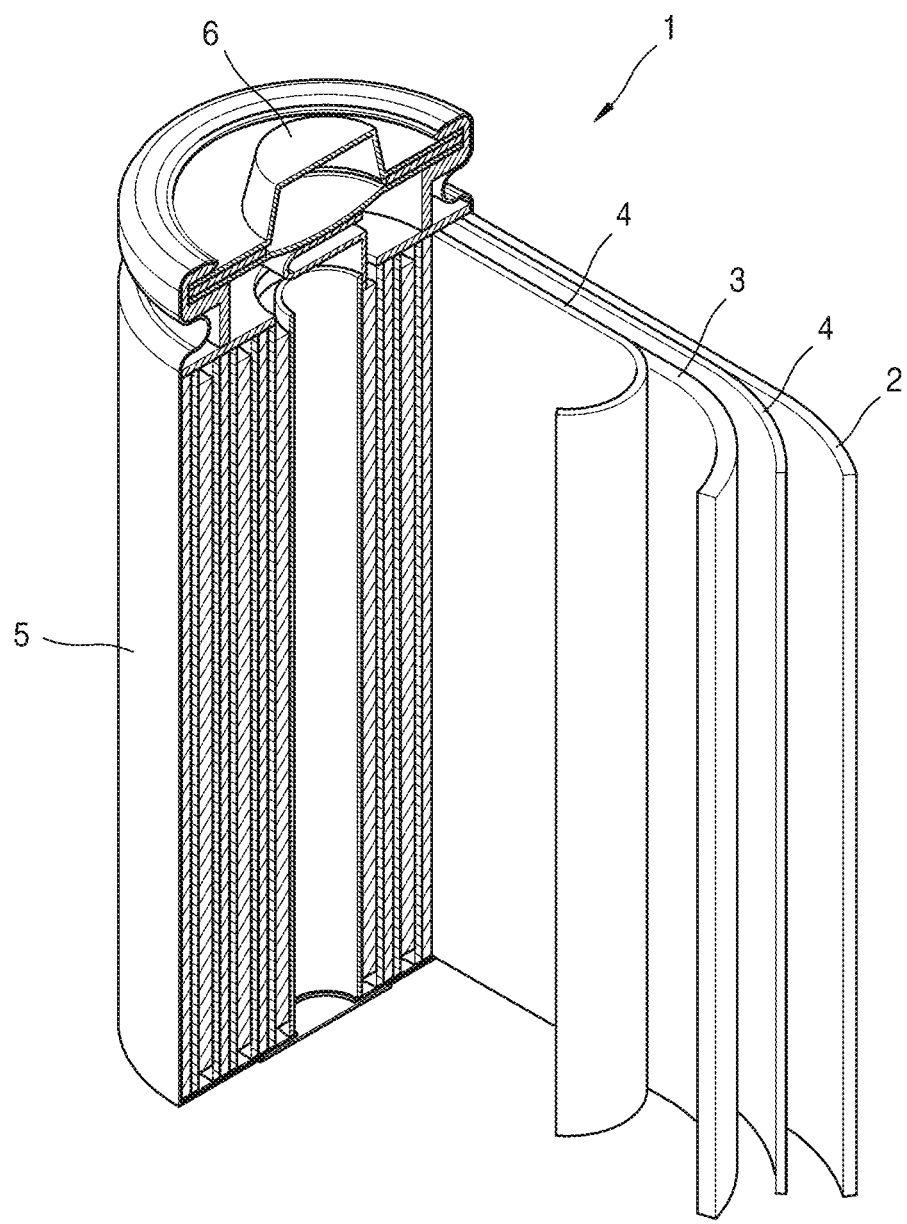
FIG. 7 is a schematic view of a lithium battery according to an embodiment of the present disclosure.

For example, as illustrated in FIG. 7, a lithium ion battery 1 includes a cathode 3, an anode 2, and a separator 4. The cathode 3, the anode 2, and the separator 4 are wound or folded and, thereafter, accommodated in a battery case 5. Subsequently, an organic electrolytic solution is injected into the battery case 5 and the battery case 5 is sealed with a cap assembly 6, thereby completing the manufacture of the lithium ion battery 1. The battery case 5 may have a cylindrical, rectangular or thin film shape. For example, the lithium ion battery 1 may be a thin film-type battery.

For example, the lithium ion battery may be a lithium ion polymer battery. In the lithium ion polymer battery, a separator is disposed between a cathode and an anode to form a battery assembly. Subsequently, a plurality of battery assemblies may be stacked in a bi-cell structure or wound and impregnated with an organic electrolytic solution, and the resultant structure may be placed into a pouch and hermetically sealed, thereby completing the manufacture of the lithium ion polymer battery.

In addition, the battery assemblies are stacked to form a battery pack, and such a battery pack may be used in any devices requiring high capacity and high-power output. For example, the battery pack may be used in notebook computers, smart phones, electric vehicles, and the like.

In particular, the lithium ion battery has excellent thermal stability and satisfactory battery characteristics and thus is suitable for use in electric vehicles (EVs). For example, the lithium ion battery may be used in hybrid vehicles such as a plug-in hybrid electric vehicle (PHEV) or the like.

In another embodiment, the lithium battery may be a lithium air battery.

For example, the lithium air battery may be prepared as follows.

First, an air electrode is prepared as a cathode. For example, the air electrode may be fabricated as follows. An electrode member may be manufactured by mixing a conductive material and a binder with or without a suitable solvent to prepare an air electrode slurry, coating the air electrode slurry on a surface of a current collector and drying the coated current collector and, selectively, performing compression molding on the current collector to enhance electrode density. The current collector may be a gas diffusion layer. In another embodiment, the electrode member may be manufactured by coating the air electrode slurry on a surface of a separator or a solid electrolyte membrane, drying the coated member and, selectively, performing compression molding on the separator or the solid electrolyte membrane to enhance electrode density.

A conductive material included in the air electrode slurry may be porous. Thus, the conductive material is not particularly limited so long as it has porosity and conductivity. The conductive material may be, for example, a porous carbonaceous material. Examples of the carbonaceous material may include carbon blacks, graphite, graphene, activated carbons, and carbon fibers.

A catalyst for oxidation/reduction of oxygen may be added to the air electrode slurry. Examples of the catalyst include, but are not limited to, precious metal catalysts such as platinum, gold, silver, palladium, ruthenium, rhodium, and osmium; oxide catalysts such as manganese oxide, iron oxide, cobalt oxide, and nickel oxide; and an organic metal catalyst such as cobalt phthalocyanine. However, the catalyst is not particularly limited to the above examples, and any catalyst for oxidation/reduction of oxygen may be used.

In addition, the catalyst may be disposed on a catalyst support. The catalyst support may be oxide, zeolite, clay mineral, carbon, or the like. The oxide may include at least one oxide of alumina, silica, zirconium oxide, and titanium dioxide. The oxide may be an oxide including cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. Examples of the carbon include carbon blacks such as Ketjen black, acetylene black, channel black, and lamp black; graphite such as natural graphite, artificial black, and expandable graphite; activated carbons; and carbon fibers. However, the carbon is not limited to the above examples, and, for example, any catalyst support used in the art may be used.

The air electrode slurry may include a binder. The binder may include a thermo-plastic resin or a thermosetting resin. Examples of the binder include polyethylene, polypropylene, polytetrafluoro ethylene (PTFE), polyvinylidene fluoride (PVDF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, and an ethylene-acrylic acid copolymer. In this regard, the binders may be used alone or in combination. However, the binder is not limited to the above examples, and any suitable binder may be used.

To rapidly diffuse oxygen, the current collector may be a porous structure in a net or mesh form or a porous metal plate formed of stainless steel, nickel, aluminum, or the like. However, the current collector is not limited to the above examples, and any suitable current collector may be used. The current collector may be coated with an oxidation resistant metal or alloy in order to prevent oxidation of the current collector.

The current collector may comprise a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any suitable alloy thereof, or a conductive film prepared by dispersing a conductive material in a rubber or a resin such as styrene-ethylene-butylene-styrene copolymer (SEBS). For example, aluminum, nickel, or stainless steel may be used. Particularly, aluminum may be used since it can be easily processed into a thin film and is inexpensive.

A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

The air electrode slurry may selectively include a general catalyst for oxidation/reduction of oxygen and a general conductive material. In addition, the air electrode slurry may selectively include lithium oxide.

Next, the protected anode described above is prepared as an anode.

Next, the separator for lithium batteries described above is disposed between the air electrode and the protected anode. As the separator, the separator used in the lithium ion battery described above may be used.

In addition, instead of the separator or in addition to a polymer separator, an oxygen blocking film that is impervious to oxygen may further be disposed between the air electrode and the protected anode. The oxygen blocking film may be a lithium ion conductive solid electrolyte membrane and may serve as a protective film that prevents impurities such as oxygen and the like included in the air electrode from directly reacting with a Li metal anode. A material for forming the lithium ion conductive solid electrolyte membrane impervious to oxygen may be lithium ion conductive glass, lithium ion conductive crystals (ceramic or glass-ceramic), or an inorganic material containing a mixture thereof. However, the material is not particularly limited to the above examples, and any suitable solid electrolyte membrane that has suitable lithium ion conductivity, is sufficiently impervious to oxygen, and is effective to protect an anode may be used. Taking chemical stability of the lithium ion conductive solid electrolyte membrane into consideration, the lithium ion conductive solid electrolyte membrane may include an oxide.

For example, an oxygen blocking film including lithium ion conductive crystals may be a solid electrolyte membrane including $Li_{1+x+y}Al_x(Ti,Ge)_{2-x}Si_yP_{3-y}O_1$ wherein $0 \leq x \leq 2$ and $0 \leq y \leq 3$, for example, LATP($Li_{1.4}Ti_{1.6}Al_{0.4}P_3O_{12}$).

Next, an electrolyte is injected into the air electrode and the protected anode. The electrolyte may be the same as that used in the lithium ion battery. The electrolyte may be impregnated in the separator and the cathode (air electrode).

The shape of the lithium air battery is not particularly limited. For example, the lithium air battery may have a coin shape, a button shape, a sheet shape, a stack type, a cylinder shape, a panel shape, a corn shape, or the like. Also, the lithium air battery may be used as a large-size battery for electric vehicles and the like.

The term "air" as used herein is not limited to atmospheric air and refers to both a gas combination including oxygen and a pure oxygen gas. The broad definition of the term "air" may be applied to all kinds of applications including an air battery, an air cathode, and the like.

A method of preparing the random copolymer, according to another embodiment of the present disclosure, includes polymerizing a first monomer represented by Formula 8 below and a second monomer represented by Formula 9 below:

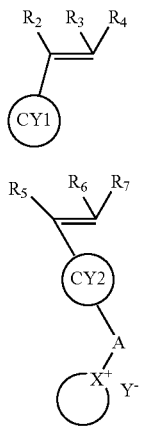

Formula 8

Formula 9 wherein

CY1 and CY2 are each independently a substituted or unsubstituted $C_6$-$C_{30}$ aryl ring or a substituted or unsubstituted $C_2$-$C_{30}$ heteroaryl ring;

A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group;

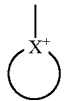

is a 3 to 31-membered ring containing X and 2 to 30 carbon atoms;

X is S, N($R_9$), or P($R_{10}$);

$R_2$ to $R_7$, $R_9$, and $R_{10}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group; and $Y^-$ is an anion.

In the preparation of the random copolymer, another monomer in addition to the first and second monomers may be further used. By further including another monomer, physical properties of the random copolymer may be adjusted. The other monomer is not particularly limited and any suitable monomer for preparation of a random copolymer may be used. For example, the other monomer may be an acryl monomer such as acrylate or methacrylate.

In the preparation of the random polymer, the polymerization process may be a solution polymerization. However, the polymerizing method is not particularly limited and any suitable polymer preparation method may be used. Also, polymerization temperature and polymerization time are not particularly limited and may vary accordingly.

The amount of the other monomer may be in the range of about 1 mole percent (mol %) to about 50 mol % with respect to a total mole number (100 mol %) of the first and second monomers. However, the amount of the other monomer is not particularly limited and may be appropriately changed.

The second monomer of Formula 9 may be prepared by substituting, with r, a halogen anion of an intermediate product obtained by reaction between the monomer of Formula 10 and a compound represented by

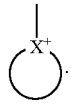

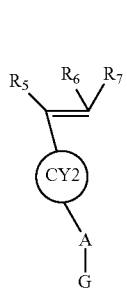

Formula 10 wherein

CY2 is a substituted or unsubstituted $C_6$-$C_{30}$ aryl ring or a substituted or unsubstituted $C_2$-$C_{30}$ heteroaryl ring;

A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group;

$R_5$ to $R_7$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted C₄-C₃₀ heteroarylalkyl group, a substituted or unsubstituted C₃-C₃₀ heteroaryloxy group, a substituted or unsubstituted C₃-C₃₀ heteroarylthio group, a substituted or unsubstituted C₃-C₃₀ cycloalkyl group, a substituted or unsubstituted C₃-C₃₀ cycloalkyloxy group, a substituted or unsubstituted C₃-C₃₀ heterocycloalkyl group, a substituted or unsubstituted C₃-C₃₀ alkenyl group, a substituted or unsubstituted C₃-C₃₀ alkynyl group, or a substituted or unsubstituted C₂-C₁₀₀ alkyleneoxide group; and G is a halogen atom.

The moiety

is a 3 to 31-membered ring containing X and 2 to 30 carbon atoms, wherein

X is S, N(R₉), or P(R₁₀) wherein

R₉ and R₁₀ are each independently hydrogen, a halogen atom, a substituted or unsubstituted C₁-C₃₀ alkyl group, a substituted or unsubstituted C₁-C₃₀ heteroalkyl group, a substituted or unsubstituted C₁-C₃₀ alkoxy group, a substituted or unsubstituted C₆-C₃₀ aryl group, a substituted or unsubstituted C₇-C₃₀ arylalkyl group, a substituted or unsubstituted C₆-C₃₀ aryloxy group, a substituted or unsubstituted C₆-C₃₀ arylthio group, a substituted or unsubstituted C₃-C₃₀ heteroaryl group, a substituted or unsubstituted C₄-C₃₀ heteroarylalkyl group, a substituted or unsubstituted C₃-C₃₀ heteroaryloxy group, a substituted or unsubstituted C₃-C₃₀ heteroarylthio group, a substituted or unsubstituted C₃-C₃₀ cycloalkyl group, a substituted or unsubstituted C₃-C₃₀ cycloalkyloxy group, a substituted or unsubstituted C₃-C₃₀ heterocycloalkyl group, a substituted or unsubstituted C₃-C₃₀ alkenyl group, a substituted or unsubstituted C₃-C₃₀ alkynyl group, or a substituted or unsubstituted C₂-C₁₀₀ alkyleneoxide group.

Substituents used in the formulae described herein are defined as follows.

The term "alkyl" as used herein refers to a fully saturated, branched or non-branched (or straight chain or linear) hydrocarbon group.

Non-limiting examples of the alkyl group include methyl, ethyl, n-propyl, iso-propyl, n-butyl, iso-butyl, sec-butyl, n-pentyl, iso-pentyl, neo-pentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a $C_1$-$C_{20}$ alkyl group substituted with a halogen atom (e.g., $CCF_3$, $CHCF_2$, $CH_2F$, $CCl_3$, or the like), a $C_1$-$C_{20}$ alkoxy group, a $C_2$-$C_{20}$ alkoxyalkyl group, a hydroxyl group, a nitro group, a cyano group, an amino group, an alkyl amino group, an amidino group, a hydrazine, a hydrazone, a carboxyl group or a salt thereof, a sulfonyl group, a sulfamoyl group, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

The term "heteroalkyl" as used herein indicates an alkyl group as defined above in which at least one carbon atom is replaced with a heteroatom selected from nitrogen (N), oxygen (O), phosphorus (P), or sulfur (S) and having carbon as remaining atoms. Non-limiting examples of the heteroalkyl are methylthio, dimethylamino, and the like. The $C_1$-$C_{20}$ heteroalkyl group does not include the $C_1$-$C_{20}$ alkoxy group.

The term "alkenyl group" as used herein means an aliphatic hydrocarbon group having at least one carbon-carbon double bond.

The term "alkynyl group" as used herein means an aliphatic hydrocarbon group having at least one carbon-carbon triple bond.

The term "cycloalkyl group" as used herein means an aliphatic hydrocarbon group having at least one ring. In this regard, the term "alkyl" is the same as defined above.

The term "heterocycloalkyl group" as used herein means a cycloalkyl group having at least one hetero atom selected from nitrogen (N), oxygen (O), phosphorus (P), and sulfur (S). In this regard, the term "cycloalkyl" is the same as defined above.

The term "halogen atom" as used herein includes fluorine, bromine, chlorine, or iodine.

The term "alkoxy group" as used herein refers to alkyl-O—. In this regard, the term "alkyl" is the same as defined above. Non-limiting examples of the alkoxy group include a methoxy group, an ethoxy group, a propoxy group, a 2-propoxy group, a butoxy group, a t-butoxy group, a pentyloxy group, a hexyloxy group, a cyclopropoxy group, a cyclohexyloxy group, and the like. At least one hydrogen atom of the alkoxy group may be substituted with the same substituent as that defined with respect to the term "alkyl group" above.

The term "cycloalkyloxy group" as used herein means cycloalkyl-O—. In this regard, the term "cycloalkyl" is the same as defined above.

The term "heterocycloalkyloxy group" as used herein means heterocycloalkyl-O—. In this regard, the term "heterocycloalkyl" is the same as defined above.

The term "aryl group" as used herein is used alone or in combination and means an aromatic hydrocarbon group having at least one ring.

The term "aryl" also includes a group with an aromatic ring fused to at least one cycloalkyl ring.

Non-limiting examples of the aryl group include a phenyl group, a naphthyl group, and a tetrahydronaphthyl group.

In addition, at least one hydrogen atom of the aryl group may be substituted with the same substituent as that defined with respect to the term "alkyl group" above.

The term "arylalkyl group" as used herein means "alkyl-aryl-". In this regard, the term "alkyl" is the same as defined above.

The term "aryloxy group" as used herein means "aryl-O—". In this regard, the term "aryl" is the same as defined above.

The term "arylthio group" as used herein means "aryl-S—". In this regard, the term "aryl" is the same as defined above.

As used herein, the term "heteroaryl group" indicates a monocyclic or bicyclic organic compound including at least one heteroatom selected from N, O, P, and S, wherein the rest of the cyclic atoms are all carbon. The heteroaryl group may include, for example, one to five heteroatoms and may include five- to ten-membered rings. In the heteroaryl group, S or N may be present in various oxidized forms.

Non-limiting examples of the monocyclic heteroaryl group include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isoxazol-3-yl group, an isoxazol-4-yl group, an isoxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazin-2-yl group, a pyrazin-4-yl group, a pyrazin-5-yl group, a 2-pyrimidin-2-yl group, a 4-pyrimidin-2-yl group, and a 5-pyrimidin-2-yl group.

The term "heteroaryl group" includes a heteroaromatic ring fused to at least one of aryl, a cycloaliphatic (alicyclic) group, and a heterocyclic group.

Non-limiting examples of the bicyclic heteroaryl group include indolyl, isoindolyl, indazolyl, indolizinyl, purinyl, quinolizinyl, quinolinyl, and isoquinolinyl. At least one hydrogen atom of the heteroaryl group may be substituted with the same substituent as that defined with respect to the term "alkyl group" above.

The term "heteroarylalkyl group" as used herein indicates alkyl-heteroaryl-. In this regard, the term "aryl" is the same as defined above.

The term "heteroaryloxy group" as used herein indicates heteroaryl-O—. In this regard, the term "heteroaryl" is the same as defined above.

The term "heteroarylthio group" as used herein indicates heteroaryl-S—. In this regard, the term "heteroaryl" is the same as defined above.

The terms "alkylene," "arylene," "heteroarylene," "cycloalkylene," and "heterocycloalkylene" as used herein means groups in which one hydrogen atom of each of alkyl, aryl, heteroaryl, cycloalkyl, and heterocycloalkyl is substituted with a radical.

When a group containing a specified number of carbon atoms is substituted with any of the groups listed in the preceding paragraphs, the number of carbon atoms in the resulting "substituted" group is defined as the sum of the carbon atoms contained in the original (unsubstituted) group and the carbon atoms (if any) contained in the substituent. For example, when the term "substituted $C_1$-$C_{30}$ alkyl" refers to a $C_1$-$C_{30}$ alkyl group substituted with $C_6$-$C_{30}$ aryl group, the total number of carbon atoms in the resulting aryl substituted alkyl group is $C_7$-$C_{60}$.

Hereinafter, one or more embodiments of the present disclosure will be described in further detail with reference to the following examples and comparative examples. These examples are for illustrative purposes only and are not intended to limit the scope of the embodiments.

EXAMPLES

Polymer Preparation

Example 1: Synthesis of Random Copolymer rPSPIL-TFSI 10 grams (g) of 1-chloromethyl-4-vinylbenzene (manufactured by Oakwood chemical) was added into a reactor from which impurities such as oxygen, moisture, and the like were removed. 6.13 g (97%) of n-methylpyrrolidine (manufactured by Sigma-Aldrich) dissolved in 100 milliliters (mL) of dichloroethane was added thereto, and the resulting solution was stirred at 70° C. for 9 hours to carry out a reaction, thereby obtaining an intermediate product in which a nitrogen atom of N-methyl-pyrrolidinium was bound to a methyl group of 1-chloromethyl-4-vinylbenzene.

The intermediate product and an aqueous lithium bis (trifluoromethylsulfonyl)imide (LiTFSI, manufactured by PANAX) solution were added in a molar ratio of 1:1.2, and the resulting solution was stirred at room temperature for 6 hours to synthesize vinylbenzyl-4-methyl-pyrrolidinium$^+$TFSI$^-$(mVBMPYR$^+$TFSI$^-$) as a monomer, Cl$^-$ of which was substituted with TFSI$^-$.

Subsequently, 20 g of styrene and 10.74 g of the synthesized monomer vinylbenzyl-4-methyl-pyrrolidinium$^+$TFSI$^-$ (mVBMPYR$^+$TFSI$^-$) were added in a molar ratio of 8:2 into a reactor from which impurities such as oxygen, moisture, and the like were removed, 0.75 g of azobisisobutyronitrile (AIBN) as an initiator was added thereto, and the resulting solution was stirred at 60° C. for 15 hours to cause a polymerization reaction between the reactants. After the polymerization reaction was terminated, the solvent was removed using a rotary evaporator and the resultant was precipitated with methanol to recover a random copolymer as a polymerization product.

The weight average molecular weight of the obtained random copolymer was measured with respect to polymethyl methacrylate (PMMA) standard sample by gel permeation chromatography (GPC). The obtained polymer had a weight average molecular weight ($M_w$) of 37,000 Daltons and a polydipersity index (PDI) of 1.55.

Example 2: Synthesis of Random Copolymer rPSPIL-FSI

A random copolymer was prepared in the same manner as in Example 1, except that lithium bis(fluorosulfonyl)imide (LiFSI, manufactured by PANAX) was used instead of LiTFSI (manufactured by PANAX) as a lithium salt added to the intermediate product.

Comparative Example 1: Synthesis of Block Copolymer bPSPIL-FSI 10 g of 1-chloromethyl-4-vinylbenzene (manufactured by Oakwood chemical) was added into a reactor from which impurities such as oxygen, moisture, and the like were removed, 6.13 g (97%) of n-methylpyrrolidine (manufactured by Sigma-Aldrich) dissolved in 100 mL of dichloroethane was added thereto, and the resulting solution was stirred at 70° C. for 9 hours to cause a reaction therebetween, thereby obtaining an intermediate product in which a nitrogen atom of N-methyl-pyrrolidinium was bound to a methyl group of 1-chloromethyl-4-vinylbenzene.

Separately, 0.02 g of 2-cyano-2-propyl benzodithioate and 0.01 g of AIBN were added to 10 g of styrene, and the resultant was stirred at 60° C. for 12 hours to prepare a polystyrene charge transfer agent (PS-CTA).

Subsequently, 20 g of the PS-CTA and 10.74 g of the intermediate product in which a nitrogen atom of N-methyl-pyrrolidinium was bound to a methyl group of 1-chloromethyl-4-vinylbenzene were added to 100 mL of dichloroethane and the resulting solution was stirred at 60° C. for 15 hours to cause a polymerization reaction. After the polymerization reaction was terminated, a solvent was removed therefrom using a rotary evaporator and the resulting solution was precipitated with methanol to recover a block copolymer as a polymerization product.

Protected Anode Manufacture

Example 3

0.4 g of the random copolymer prepared according to Example 1 was dissolved in 4 mL of a mixed solvent of dimethylformamide (DMF) and tetrahydrofuran (THF) (volume ratio=5:5) to obtain a polymer solution. Thereafter, the solution was coated onto lithium foil having a thickness of 20 μm by using a doctor blade and dried in a drying room at room temperature for two days, followed by vacuum drying at 60° C. overnight to remove the solvent, thereby completing the manufacture of a protected anode in which a protective layer having a thickness of 5 μm and including the random copolymer of Example 1 was formed on the lithium anode. Since the protective layer includes the random copolymer, which is polymeric ionic liquid, the protective layer may act as an electrolyte layer.

Example 4

A protected anode was manufactured in the same manner as in Example 3, except that the random copolymer prepared according to Example 2 was used instead of the random copolymer of Example 1. Since the protective layer includes the random copolymer, which is polymeric ionic liquid, the protective layer may act as an electrolyte layer.

Example 5

0.4 g of the random copolymer of Example 2 was dissolved in 4 mL of a mixed solvent of DMF and THF (volume ratio=5:5) to obtain a polymer solution, and 0.2 g of LiTFSI was added thereto and dissolved therein. Thereafter, the solution was coated onto lithium foil having a thickness of 20 μm by using a doctor blade and dried in a drying room at room temperature for two days, followed by vacuum drying at 60° C. overnight to remove the solvent, thereby completing the manufacture of a protected anode, in which a protective layer having a thickness of 5 μm and including the random copolymer of Example 2 was formed on the lithium anode. Since the protective layer includes the random copolymer, which is polymeric ionic liquid, and a lithium salt, the protective layer may act as an electrolyte layer.

Comparative Example 2

Lithium foil having a thickness of 20 μm on which a protective layer was not formed was used as an anode.

Comparative Example 3

A protected anode was manufactured in the same manner as in Example 3, except that the block copolymer prepared according to Comparative Example 1 was used instead of the random copolymer of Example 1.

Manufacture of Lithium Battery

Example 6

The protected anode manufactured according to Example 3 was prepared.
Next, a cathode was prepared.
$LiCoO_2$ (3.5 milliampere hours per square centimeter ($mAh/cm^2$), manufactured by SAMSUNG SDI), Super-P as a conductive agent (manufactured by Timcal Ltd.), polyvinylidene fluoride (PVdF), and N-methyl-pyrrolidone were mixed to obtain a cathode composition. In the cathode composition, a mixing weight ratio of $LiCoO_2$, the conductive agent, and PVDF was 97:1.5:1.5. The cathode composition was coated on aluminum foil having a thickness of about 15 μm and dried at 25° C. The dried resultant was dried in vacuum at about 110° C., thereby completing the manufacture of the cathode.

Subsequently, a polyethylene/polypropylene separator was disposed between the cathode and the protected anode and a liquid electrolyte was injected thereinto, thereby completing the manufacture of a lithium battery (coin cell).

As the liquid electrolyte, an electrolyte prepared by dissolving 1.0 M LiTFSI in a mixed solvent of dimethoxyethane (DME) and 1,1,2,2-tetrafluoroethyl-2,2,3,3-tetrafluoropropylether (TTE) in a volume ratio of 2:8 was used.

Examples 7 and 8

Lithium batteries were manufactured in the same manner as in Example 6, except that each of the protected anodes manufactured according to Examples 4 and 5 was used instead of the protected anode of Example 3, respectively.

Comparative Examples 4 and 5

Lithium batteries were manufactured in the same manner as in Example 6, except that each of the anode manufactured according to Comparative Example 2 and the protected anode manufactured according to Comparative Example 3 was used instead of the protected anode of Example 3, respectively.

Evaluation Example 1: Thermogravimetric Analysis

Changes in weight of the random copolymer of Example 2 were measured using a thermogravimetric measurement analyzer (TA instrument discovery series) at a heating rate of 10 degrees Centigrade per minute (° C./min) and a temperature ranging from room temperature to 600° C. in a nitrogen atmosphere. The measurement results are shown in FIG. 1. As illustrated in FIG. 1, a pyrolysis peak derived from N-methyl-pyrrolidinium was obtained at a relatively low temperature and a pyrolysis peak derived from styrene with high thermal resistance was obtained at a relatively high temperature. Thus, it is confirmed that the prepared random copolymer included both a styrene moiety and an N-methyl-pyrrolidinium moiety.

In addition, the random copolymer had a glass transition temperature $T_g$ of 55° C.

Evaluation Example 2: Mass Spectrometry

Matrix assisted laser desorption and ionization-time of flight (MALDI-TOF) analysis was performed on the random copolymer of Example 2 by using a mass spectrometer (Ultraflex III TOF/TOF 200 manufactured by Bruker). The analysis results are shown in FIG. 2.

Figure 2:
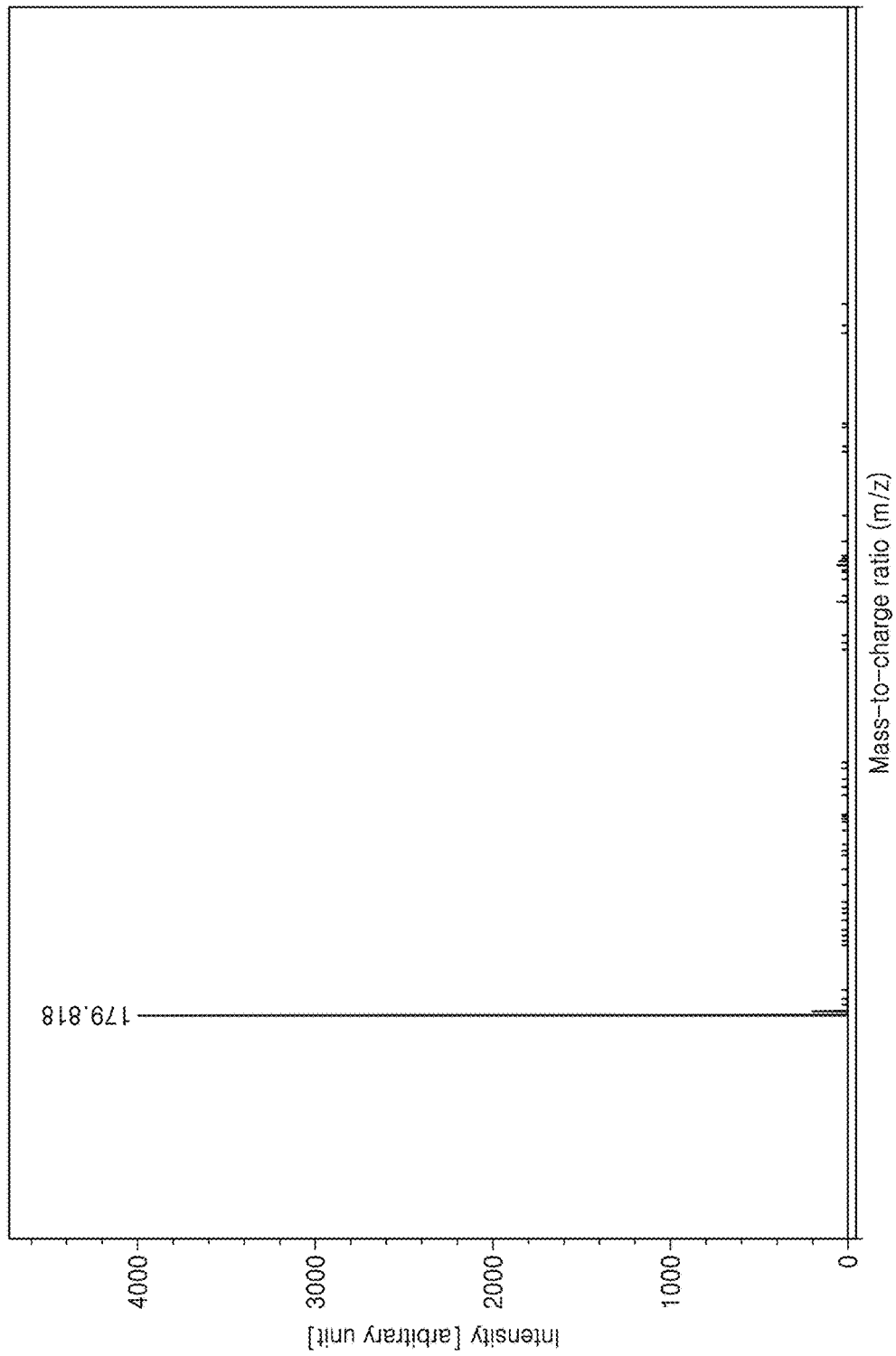
FIG. 2 is a graph of intensity (arbitrary units, a. u.) versus mass-to-charge ratio (m/z) and is a result of matrix-assisted laser desorption/ionization-time-of-flight (MALDI-TOF) analysis of the random copolymer of Example 2.

As illustrated in FIG. 2, it is confirmed that the anion of the random copolymer was $FSI^-$.

Evaluation Example 3: Fourier-Transform Infrared (FT-IR) Spectrometry

Figure 3:
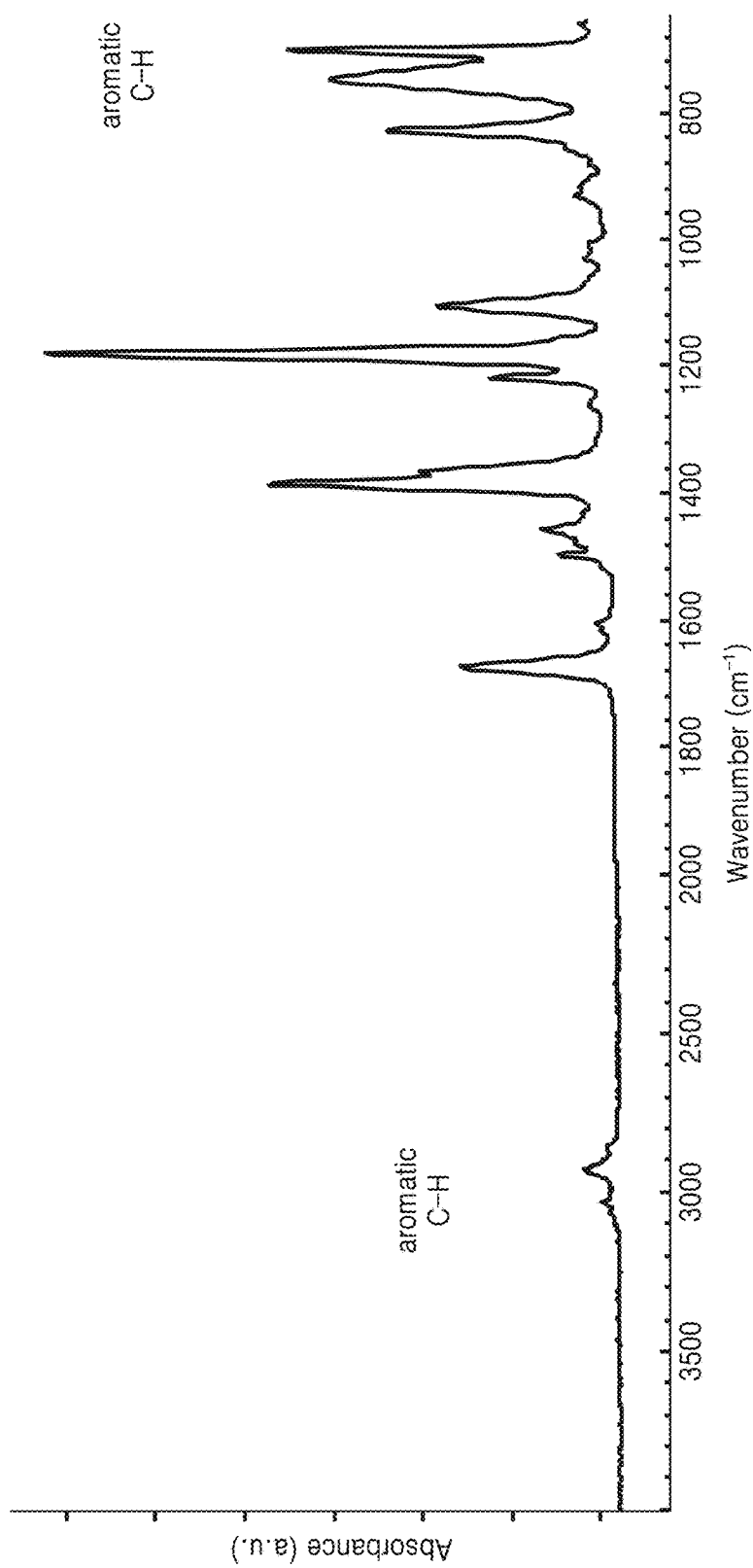
FIG. 3 is a graph of absorbance (arbitrary units, a. u.) versus wavenumber (reverse centimeters, $cm^{-1}$) and is a results Fourier transform infrared (FT-IR) analysis of the random copolymer of Example 2.

FT-IR spectrometry of the random copolymer of Example 2 was performed and the results are shown in FIG. 3. As illustrated in FIG. 3, a peak corresponding to an aromatic C—H bond derived from polystyrene was observed, and a peak corresponding to C=C bond and C—H ($sp^2$ orbital) bond derived from a vinyl group of styrene was not observed. In addition, a peak corresponding to C—Cl bond of 1-chloromethyl-4-vinylbenzene was also not observed.

Thus, it is confirmed that the random copolymer was synthesized through complete polymerization.

Evaluation Example 4: Protected Anode Morphology Evaluation

Each of the lithium battery manufactured according to Comparative Example 4 including the lithium anode of Comparative Example 2 and the lithium batteries manufactured according to Examples 7 and 8 respectively including the protected anodes of Examples 4 and 5 was charged at a constant current (4 milliamperes, mA) of 0.1 C rate at 25° C. for 1 hour until the voltage reached 4.4 V (vs. Li) and, thereafter, each lithium battery was disassembled and surface and cross-section of the anode of each lithium battery were observed using a scanning electron microscope (SEM). Observation results are shown in FIGS. 4A to 4F.

Figure 4A:
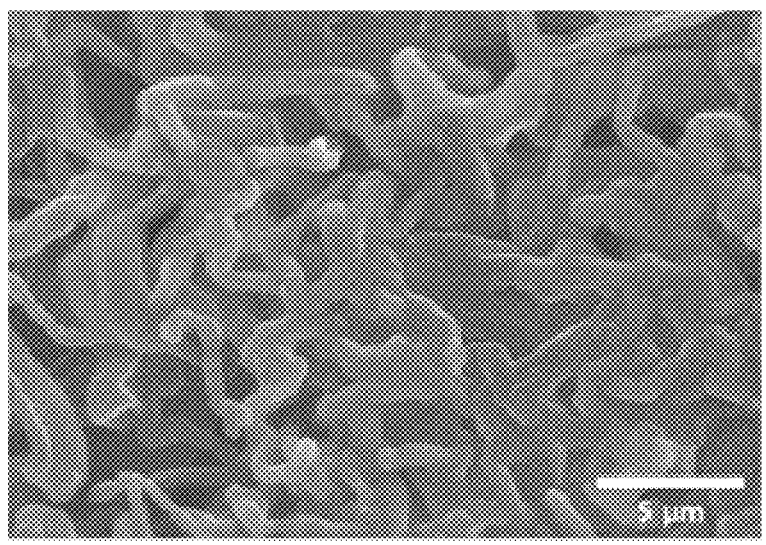
Figure 4B:
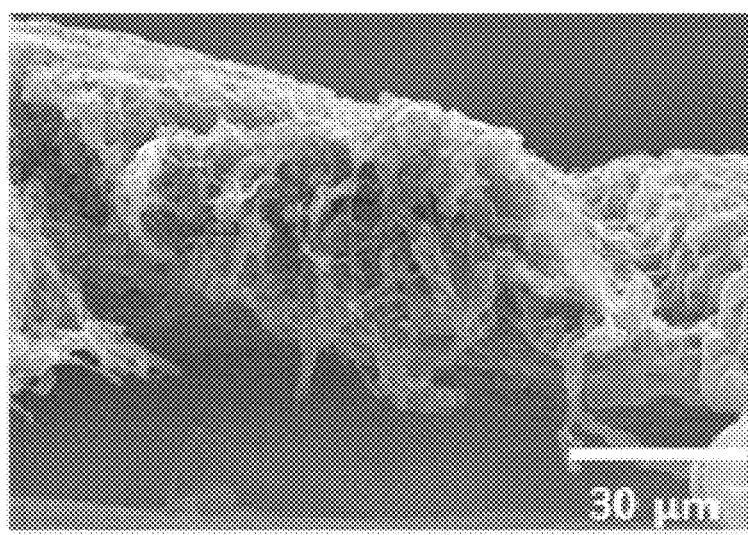

As illustrated in FIGS. 4A and 4B, in the case of the lithium anode of Comparative Example 2 with no protective layer on a surface thereof, a needle-shaped dendrite was formed on the surface of the lithium anode.

Figure 4C:
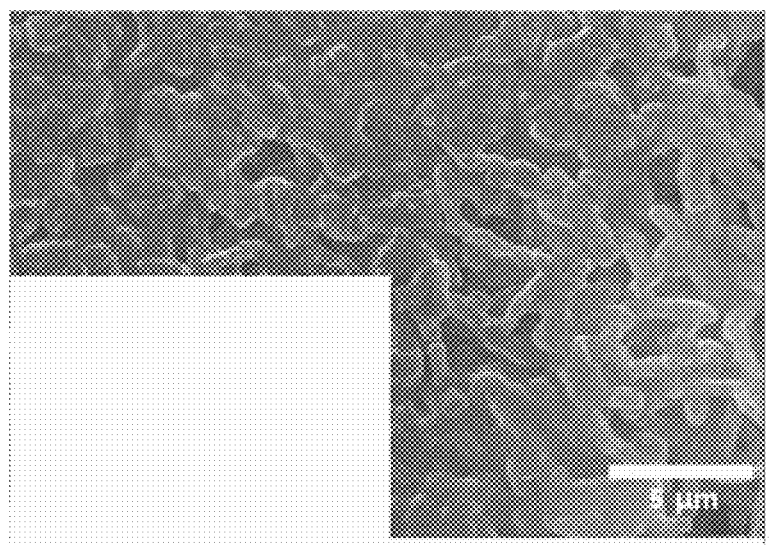
Figure 4D:
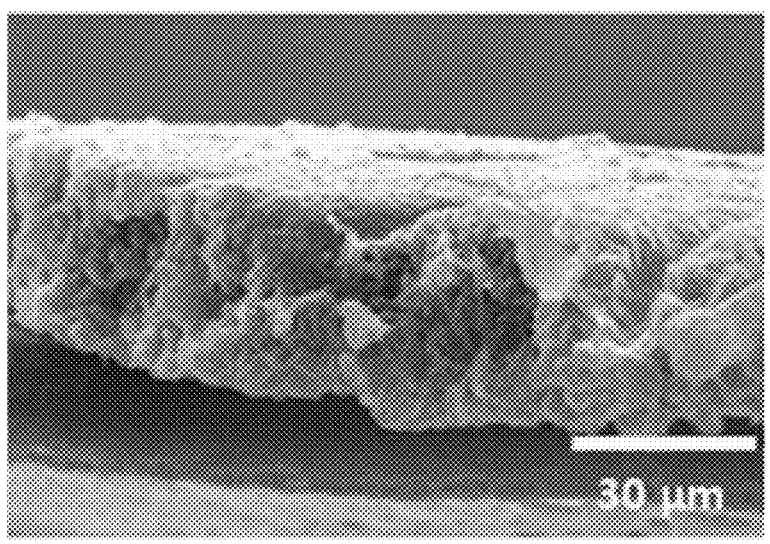
Figure 4E:
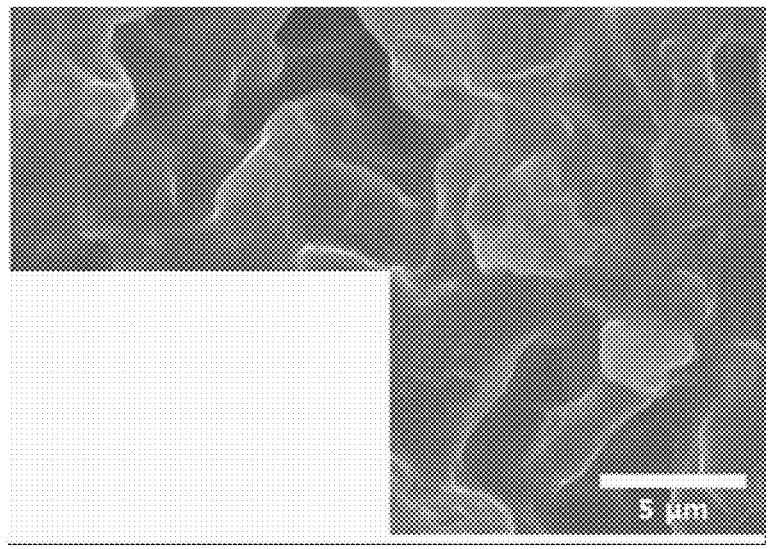
Figure 4F:
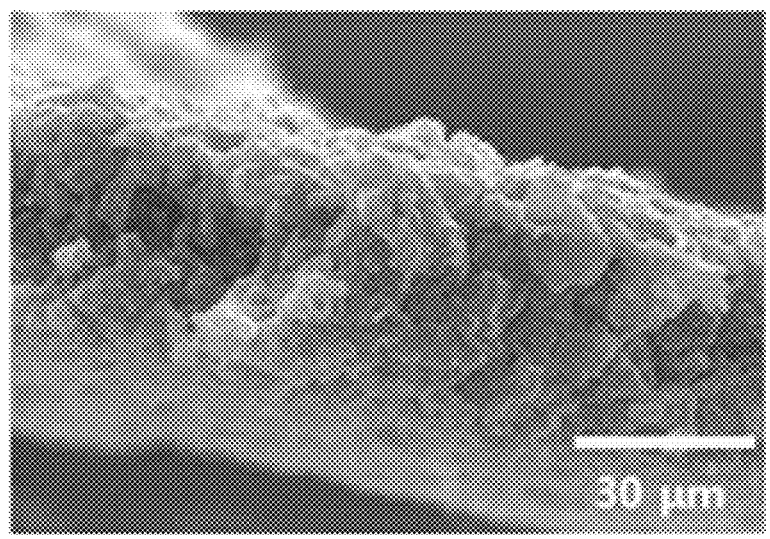

By contrast, as illustrated in FIGS. 4C and 4D, and in FIGS. 4E and 4F, in the case of the protected anodes of Examples 4 and 5, the formation of a needle-shaped dendrite at a surface of the protected anode was suppressed. In addition, the formation of a needle-shaped dendrite at the protected anode of Example 5 was suppressed in a greater extent than at the protected anode of Example 4.

In the protected anodes of Examples 4 and 5, ionic liquid moieties bound to the polymeric ionic liquid of the protective layer formed on the surface of the anode are uniformly distributed in the protective layer and have difficulty moving freely due to the chemical bonds therebetween. Thus, a charge delocalization effect, in which positive charges are uniformly distributed in an electric double layer formed between the protective layer and the surface of the anode, may be provided. Since the growth of a needle-shaped dendrite is caused by a localization of lithium ions at the surface of the anode and intensive reduction of the localized lithium ions, due to such a charge delocalization effect, the growth of a needle-shaped dendrite is effectively suppressed.

By contrast, in the case of the anode of Comparative Example 2, a needle-shaped dendrite was rapidly grown due to no protective layer.

Evaluation Example 5: Lithium Deposition Density Evaluation

The lithium battery of Comparative Example 4 including the lithium anode of Comparative Example 2, the lithium battery of Comparative Example 5 including the protected anode of Comparative Example 3, the lithium battery of Example 7 including the protected anode of Example 4, and the lithium battery of Example 8 including the protected anode of Example 5 are each charged at a constant current of 0.1 C rate at 25° C. until the voltage reached 4.4 V (vs. Li) and charged at a constant voltage of 4.4 V until the current reached 0.025 C rate. After the charging processes were terminated, the mass of lithium deposited was calculated from the charge amount used in charging, the density of a lithium deposition layer formed at the surface of the anode was calculated by estimating the volume of lithium from a change in thickness of the anode obtained by disassembling each lithium battery, and a part of the results is shown in Table 1 below.

TABLE 1

|  | Lithium deposition density [g/cm$^3$] |
|---|---|
| Comparative Example 4 | 0.1696 |
| Comparative Example 5 | 0.1762 |
| Example 7 | 0.2054 |
| Example 8 | 0.2462 |

As shown in Table 1 above, the density of lithium deposited at the surface of the protected anode included in each of the lithium batteries of Examples 7 and 8 was higher than that of lithium deposited at the surface of the anode included in each of the lithium batteries of Comparative Examples 4 and 5.

Despite employing the protective layer, the protected anode of Comparative Example 3 included in the lithium battery of Comparative Example 5 exhibited little change in lithium deposition density as compared to the anode of Comparative Example 2 not having a protective layer, included in the lithium battery of Comparative Example 4.

By contrast, the lithium deposition density of each of the protected anodes of Examples 4 and 5 respectively included in the lithium batteries of Examples 7 and 8 significantly increased by 16% to 39%, as compared to the anode of Comparative Example 2 not having a protective layer, included in the lithium battery of Comparative Example 4.

The increase in lithium deposition density is attributed to compact lithium deposition due to suppression of the formation of a needle-shaped dendrite at the surface of the anode.

Evaluation Example 6: Electrochemical Stability Evaluation

A Li anode was used as a reference electrode, a bare Cu thin film electrode (thickness: 10 μm) and a protected Cu electrode (the same as the protected Li anode of Example 4, except that a bare Cu thin film (thickness: 10 μm) was used instead of the Li thin film) were each used as a working electrode. As a liquid electrolyte, an electrolyte prepared by dissolving 1.0 M LiTFSI in a mixed solvent of DME and TTE in a volume ratio of 2:8 was used, to manufacture a Li/Cu cell.

The Li/Cu cell was scanned by cyclic voltammetry at a rate of 5 millivolts per second (mV/sec) from −0.5 V to 2.0 V vs. Li metal, and it was monitored whether a reduction current due to a side reaction of the protective layer was produced. The experiment was conducted using a potentiometer (electrochemical interface (1287 ECI) manufactured by Solartron analytical).

Figure 5:
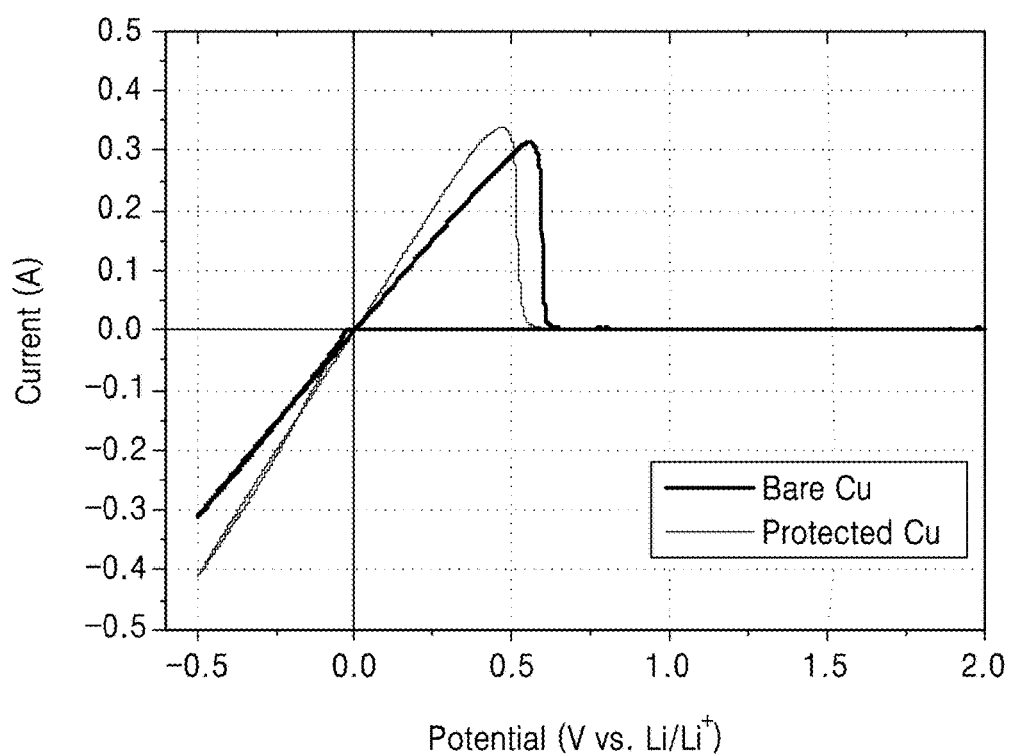
FIG. 5 is a graph of current (amperes, A) versus potential (volts versus $Li/Li^+$, V vs. $Li/Li^+$) illustrating the results of cyclic voltammetry analysis of a bare copper electrode and a protected copper electrode.

Cyclic voltammetry measurement results are illustrated in FIG. 5.

As illustrated in FIG. 5, as in the bare Cu electrode, the protected Cu electrode exhibited only a reduction current in which lithium ions are deposited at a voltage of 0 V or less vs. Li metal and an oxidation current in which the reduced Li is stripped at a voltage of 0 V or more vs. Li metal, and did not exhibit a reduction current due to a side reaction of the protective layer.

Thus, it is confirmed that the protective layer of the protected Cu electrode was electrochemically stable up to −0.5 V vs. Li metal.

Evaluation Example 7: Impedance Measurement

Changes in impedance according to the frequency of an alternating current voltage of the lithium batteries of Comparative Example 4 and Examples 7 and 8 were measured at 25° C. using a 1260 A impedance/gain-phase analyzer (Solartron). The amplitude was 10 mV and a frequency range was 0.1 Hertz (Hz) to 1 megahertz (MHz).

Figure 6:
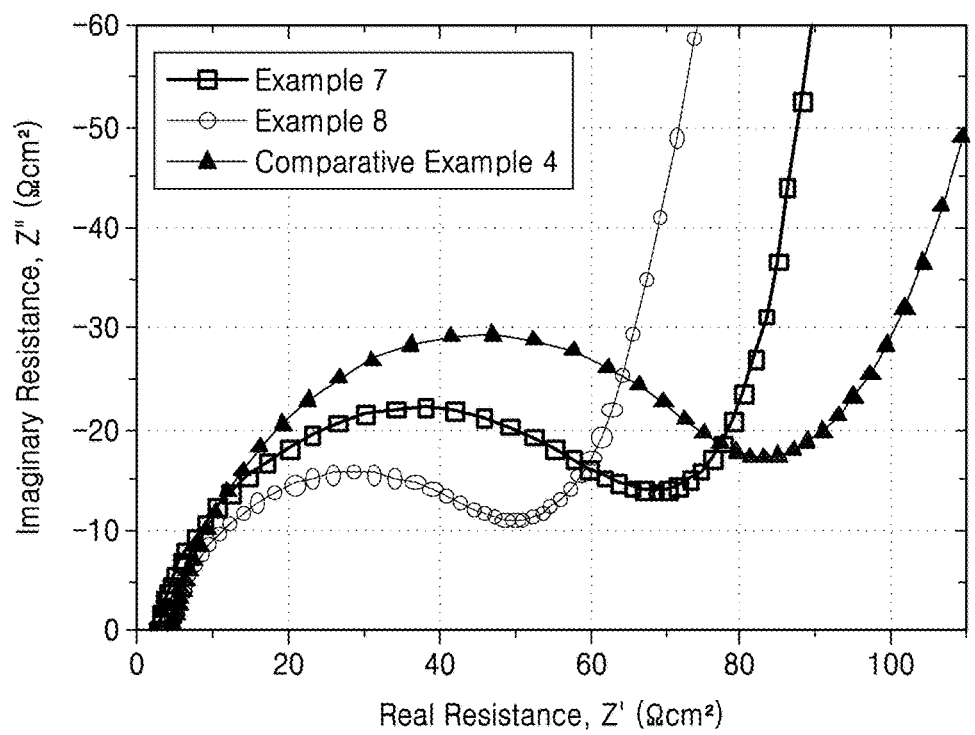
FIG. 6 is a graph of imaginary resistance (Z", Ohms-square centimeters, $\Omega \cdot cm^2$) versus real resistance (Z', Ohms-square centimeters, $\Omega \cdot cm^2$) and is a Nyquist plot, illustrating the results of electrochemical impedance spectrum (EIS) analysis of lithium batteries manufactured according to Comparative Example 4 and Examples 7 and 8.

Nyquist plots for the impedance measurement results of the lithium batteries of Comparative Example 4 and Examples 7 and 8 are illustrated in FIG. 6.

Referring to FIG. 6, a difference between x-intercepts on left and right sides of the semicircle denotes an interfacial resistance at the electrode. The resistance of the lithium battery of Example 7 decreased by 15% as compared to the lithium battery of Comparative Example 4, and the resistance of the lithium battery of Example 8 decreased by 31% as compared to the lithium battery of Comparative Example 4. The results show that the lithium batteries of Examples 7 and 8 exhibited enhanced reversibility and easiness of a charge exchange reaction at the electrode surface, as compared to the lithium battery of Comparative Example 4.

Evaluation Example 8: Lifespan Characteristics Evaluation and Coulombic Efficiency Li foil having a thickness of 100 μm was used as a reference electrode, the Li anode of Comparative Example 2 and the protected anode of Example 4 were each used as a working electrode, and, as a liquid electrolyte, an electrolyte prepared by dissolving 1.0 M LiTFSI in a mixed solvent of DME and TTE in a volume ratio of 2:8 was used, to manufacture a symmetric cell including two identical working electrodes.

Each symmetric cell was charged and discharged 120 times with a constant current of 0.1 C rate at 25° C. from −0.3 V to 0.1 V (vs. Li), electrochemical stability of each electrode was evaluated from the number of cycles in which charge/discharge efficiency, i.e., Coulombic efficiency, was maintained at 99.9% or greater, and the evaluation results are shown in Table 2 below. The Coulombic efficiency may be calculated from Equation 1 below:

$$\text{Coulombic efficiency (\%)} = (\text{discharge capacity at } n^{th} \text{ cycle/charge capacity at } n^{th} \text{ cycle}) \times 100\% \quad \text{Equation 1}$$

TABLE 2

| | Number of cycles in which 99.9% or more of Coulombic efficiency is maintained [times] |
|---|---|
| Comparative Example 2 | 78 |
| Example 4 | 107 |

As shown in Table 2 above, the electrochemical stability of the protected anode of Example 4 increased by 37% compared to the anode of Comparative Example 1. That is, the lifespan characteristics of the protected anode of Example 4 increased by 37% as compared to the anode of Comparative Example 1.

Evaluation Example 9: High-Rate Characteristics Evaluation

Each of the lithium batteries of Comparative Examples 3 and 4 and Examples 6 to 8 was charged at a constant current of 0.2 C rate at 25° C. from 3.0 V to 4.4 V vs. Li metal, and then discharged at a constant current of 0.1 C, 0.2 C, 0.5 C, 1.0 C, 1.5 C, and 2.0 C at each cycle. A part of charging/discharging experiment results is shown in Table 3 below. A capacity retention rate at the cycle of 0.2 C charging and 2.0 C discharging is calculated from Equation 2 below:

$$2.0 \text{ C capacity retention rate (\%)} = (2.0 \text{ C discharge capacity}/0.2 \text{ C charge capacity}) \times 100\% \quad \text{Equation 2}$$

TABLE 3

| | 2.0 C capacity retention rate [%] |
|---|---|
| Comparative Example 3 | 0.788 |
| Comparative Example 4 | 0.709 |
| Example 7 | 0.758 |
| Example 8 | 0.866 |

As shown in Table 3 above, the lithium batteries of Examples 7 and 8 exhibited enhanced high-rate characteristics as compared to the lithium battery of Comparative Example 4.

Evaluation Example 10: Lifespan Characteristics Evaluation

Each of the lithium batteries of Comparative Example 4 and Examples 6 to 8 was charged at a constant current of 0.7 C rate at 25° C. from 3.0 V to 4.4 V vs. Li metal, charged at a constant voltage of 4.4 V until the current decreased to 0.025 C, and then discharged at a constant current of 0.5 C. Subsequently, this cycle of charging and discharging was repeated 80 times. A part of experiment results is shown in Table 4 below. The capacity retention rate is calculated from Equation 3 below:

$$\text{Capacity retention rate (\%)} = (\text{discharge capacity at } 80^{th} \text{ cycle/discharge capacity at } 1^{st} \text{ cycle}) \times 100\% \quad \text{Equation 3}$$

TABLE 4

| | Capacity retention rate [%] |
|---|---|
| Comparative Example 4 | 87.11 |
| Example 7 | 88.97 |
| Example 8 | 91.61 |

As shown in Table 4 above, the lithium batteries of Examples 7 and 8 exhibited enhanced lifespan characteristics as compared to the lithium battery of Comparative Example 4.

As is apparent from the foregoing description, according to an embodiment of the present disclosure, when a lithium battery includes a protected anode including a novel random copolymer, the formation of a dendrite at a surface of an anode is suppressed, and the lithium battery exhibits enhanced electrochemical stability, high-rate characteristics and lifespan characteristics.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. A random copolymer represented by Formula 3:

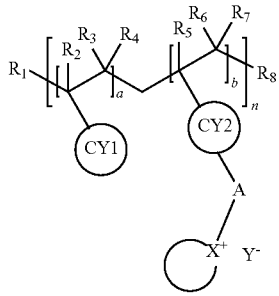

Formula 3 wherein CY1 and CY2 are each independently a substituted or unsubstituted $C_6$-$C_{30}$ aryl ring or a substituted or unsubstituted $C_2$-$C_{30}$ heteroaryl ring;

A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group;

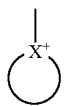

is a 3 to 31-membered ring comprising X and 2 to 30 carbon atoms;

X is S, N($R_9$), or P($R_{10}$);

$R_1$ to $R_{10}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group;

$Y^-$ is an anion;

$0.01 \leq a \leq 0.99$, $0.01 \leq b \leq 0.99$, provided that $a+b=1$; and n is an integer of 10 to 5,000.

2. The random copolymer of claim 1, wherein, in Formula 3,

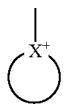

is represented by Formula 4:

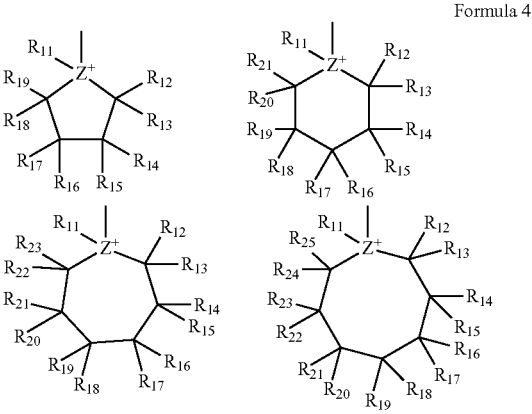

Formula 4 wherein Z is S, N, or P; and $R_{11}$ to $R_{25}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group, provided that $R_{11}$ is absent when Z is S.

3. The random copolymer of claim 1, wherein, in Formula 3,

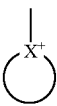

is represented by Formula 5:

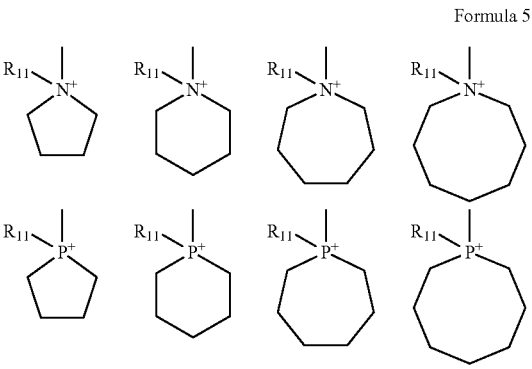

Formula 5

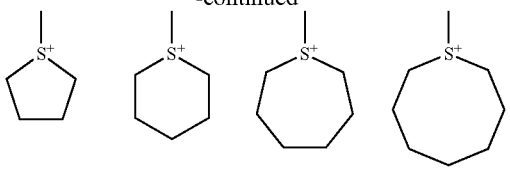

wherein $R_{11}$ is hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group.

4. The random copolymer of claim 1, wherein the random copolymer is represented by Formula 6:

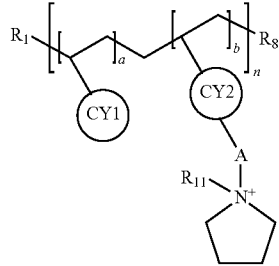

Formula 6 wherein CY1 and CY2 are each independently a substituted or unsubstituted $C_6$-$C_{30}$ aryl ring or a substituted or unsubstituted $C_2$-$C_{30}$ heteroaryl ring;

A is a single bond, a substituted or unsubstituted $C_1$-$C_{30}$ alkylene group, a substituted or unsubstituted $C_6$-$C_{30}$ arylene group, a substituted or unsubstituted $C_3$-$C_{30}$ heteroarylene group, a substituted or unsubstituted $C_4$-$C_{30}$ cycloalkylene group, or a substituted or unsubstituted $C_3$-$C_{30}$ heterocycloalkylene group;

$R_1$, $R_8$, and $R_{11}$ are each independently hydrogen, a halogen atom, a substituted or unsubstituted $C_1$-$C_{30}$ alkyl group, a substituted or unsubstituted $C_1$-$C_{30}$ heteroalkyl group, a substituted or unsubstituted $C_1$-$C_{30}$ alkoxy group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_6$-$C_{30}$ arylthio group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, a substituted or unsubstituted $C_3$-$C_{30}$ heteroarylthio group, a substituted or unsubstituted $C_3$-$C_{30}$ cycloalkyl group, a substituted or unsubstituted $C_3$-$C_{30}$ cycloalkyloxy group, a substituted or unsubstituted $C_3$-$C_{30}$ heterocycloalkyl group, a substituted or unsubstituted $C_3$-$C_{30}$ alkenyl group, a substituted or unsubstituted $C_3$-$C_{30}$ alkynyl group, or a substituted or unsubstituted $C_2$-$C_{100}$ alkyleneoxide group;

$Y^-$ is $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $C_2F_5SO_2)$ $(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof;

$0.01 \le a \le 0.99$, $0.01 \le b \le 0.99$, provided that a+b=1; and n is an integer of 10 to 5,000.

5. The random copolymer of claim 1, wherein the random copolymer is represented by Formula 7:

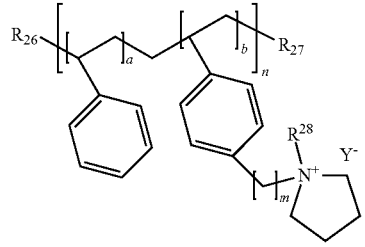

Formula 7 wherein $R_{26}$, $R_{27}$, and $R_{28}$ are each independently hydrogen, a halogen atom, a substituted or unsubstituted $C_1$-$C_{30}$ alkyl group, a substituted or unsubstituted $C_1$-$C_{30}$ alkoxy group, or a substituted or unsubstituted $C_2$-$C_{100}$ alkyleneoxide group;

$Y^-$ is $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $C_2F_5SO_2)$ $(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof;

$0.01 \le a \le 0.99$, $0.01 \le b \le 0.99$, provided that a+b=1; and m is an integer of 1 to 10 and n is an integer of 10 to 5,000.

6. The random copolymer of claim 5, wherein $R_{28}$ is a methyl group, an ethyl group, a propyl group, or a butyl group.

7. The random copolymer of claim 1, wherein the random copolymer has a number average molecular weight of about 3,000 Daltons to about 200,000 Daltons.

8. The random copolymer of claim 1, wherein the random copolymer has a polydispersity index of about 1 to about 3.

9. The random copolymer of claim 1, wherein the random copolymer further comprises a third repeating unit.

10. The random copolymer of claim 1, wherein the random copolymer is electrochemically stable to −0.4 Volts versus lithium.

11. An electrolyte comprising the random copolymer according to claim 1.

12. A protected anode comprising:
an anode; and
a protective layer disposed on the anode,
wherein the protective layer comprises the random copolymer according to claim 1.

13. The protected anode of claim 12, wherein the anode comprises lithium, a lithium alloy, a metal alloyable with lithium, or a combination thereof.

14. The protected anode of claim 12, wherein the protective layer further comprises a lithium salt.

15. The protected anode of claim 12, wherein the protective layer has a thickness of about 0.1 micrometers to about 100 micrometers.

16. A lithium battery comprising:
a cathode;
the protected anode according to claim 12; and
an electrolyte disposed between the cathode and the protected anode.

17. The lithium battery of claim 16, wherein the electrolyte is a liquid electrolyte or a solid electrolyte.

* * * * *